United States Patent [19]
Katayama et al.

[11] Patent Number: 5,682,198
[45] Date of Patent: Oct. 28, 1997

[54] DOUBLE EYE IMAGE PICKUP APPARATUS

[75] Inventors: Tatsushi Katayama, Tokyo; Katsumi Iijima, Hachioji; Kotaro Yano, Tokyo, all of Japan

[73] Assignee: Canon Kabushiki Kaisha, Tokyo, Japan

[21] Appl. No.: 645,187

[22] Filed: May 13, 1996

Related U.S. Application Data

[63] Continuation of Ser. No. 267,117, Jun. 24, 1994, abandoned.

[30] Foreign Application Priority Data

Jun. 28, 1993  [JP]  Japan .................................. 5-157584
Sep. 8, 1993   [JP]  Japan .................................. 5-223544

[51] Int. Cl.$^6$ .................................................. H04N 13/02
[52] U.S. Cl. .................................................. 348/47
[58] Field of Search ........................... 348/445, 42, 43, 348/47, 218, 335; 382/284; H04N 13/100, 13/02

[56] References Cited

U.S. PATENT DOCUMENTS

| | | | |
|---|---|---|---|
| 4,751,570 | 6/1988 | Robinson | 348/47 |
| 4,881,122 | 11/1989 | Murakami | 348/47 |
| 5,140,647 | 8/1992 | Ise et al. | 382/41 |
| 5,202,928 | 4/1993 | Tomita et al. | 382/22 X |

*Primary Examiner*—Wendy Garber
*Attorney, Agent, or Firm*—Morgan & Finnegan LLP

[57] ABSTRACT

A double eye image pickup apparatus performs image pickup using a plurality of image pickup systems with partly overlapping fields in order to obtain an image at an arbitrary aspect ratio while correcting the registration and taking an image of occlusion area into consideration, and the apparatus has a device for setting a virtual projection plane in a subject space, based on image signals of overlap portions output from the respective image pickup systems, and a device for projecting image signals onto the projection plane to combine the image signals into a single image signal.

5 Claims, 19 Drawing Sheets

AREA NUMBER WHICH CORRESPONDING POINTS HAVE BEEN OBTAINED

DOUBLE EYE IMAGE PICKUP APPARATUS

This is a continuation of application Ser. No. 08/267,117, filed on Jun. 24, 1994 now abandoned.

BACKGROUND OF THE INVENTION

1. Field of the Invention

The present invention relates to a double eye image pickup apparatus, and more particularly to a double eye image pickup apparatus which can produce an image at an arbitrary aspect ratio in such a manner that a common subject is taken through a plurality of image pickup systems such as TV or video cameras with the fields thereof partly overlapping with each other and that a plurality of taken images are combined with each other to obtain an arbitrary aspect-ratio image.

2. Related Background Art

There are methods conventionally known as the panorama image pickup technology for dynamic images using a plurality of image pickup systems, for example as described in Japanese Laid-open Patent Application No. 63-8641. The application describes such a method that a space is divided into a plurality of spatial zones, information pieces on the spatial zones are simultaneously recorded, and these information pieces are simultaneously reproduced in a reproduction space. Generally, such technology employs mechanical adjustment of angles of optical axes of the image pickup systems to make fields thereof connected with each other.

There is also an aspect ratio conversion method of trimming top and bottom margins or left and right margins of a screen before outputting, known as an aspect ratio conversion method for changing an aspect ratio of television screen. This is used for example in converting an aspect ratio of a television screen according to the NTSC method (4:3) into an aspect ratio of a television screen for the HD method or for the ED method (16:9). Since this aspect ratio conversion method is a method using a part of a taken image, there is no problem caused in respect of the quality of image, but there is a problem of a decrease in horizontal field angle to one third, specifically if a subject is taken through an NTSC camera using an image sensor with an aspect ratio of 4:3 and the image is output to a monitor for NTSC with an aspect ratio of 4:3.

Meanwhile, some papers suggest double eye image pickup apparatus for obtaining a high-definition image by combining overlap areas in a plurality of images obtained in taking a common subject through a plurality of image pickup systems, for example as described in Institute of Image Electronics of Japan, preliminary paper 90-03-04, p23-p28. Also, Japanese Laid-open Patent Application No. 5-110926 suggests an image combining apparatus which receives a plurality of images, performs a coordinate conversion process for the images, combines the processed images and outputs an image with a wider field.

Applying such double eye image pickup apparatus and image combining apparatus, a double eye image pickup apparatus can be constructed for producing an image at an arbitrary aspect ratio by taking images of a common subject using a plurality of image pickup systems with fields thereof partly overlapping and combining the thus obtained images. That is, a double eye image pickup apparatus can be constructed as shown in FIG. 25, in which two image pickup systems (left pickup system $110_L$ and right pickup system $110_R$) are used to obtain images of a common subject 101 in a state of the fields partially overlapping and in which a central processing unit (CPU) 120 combines a left image $P_L$ obtained from the left pickup system $110_L$ with a right image $P_R$ obtained from the right pickup system $110_R$ to produce a single image $P_{L+R}$ at an arbitrary aspect ratio.

SUMMARY OF THE INVENTION

The image pickup systems in the conventional examples had, however, the following problems. Because the angles of the optical axes were set by the mechanical adjustment, it was difficult to make two adjacent images in registration, and boundary lines were normally conspicuous. Further, it was also difficult to incorporate an occlusion area, which is an area taken by a certain image pickup system but not taken by another image pickup system, appearing when a subject located at a finite distance is taken, into a final image without a feeling of incompatibility.

It is, therefore, an object of the present invention to provide an image pickup apparatus which can obtain an image at an arbitrary aspect ratio, solving the above problems, correcting the registration, and taking an image in the occlusion area into consideration.

A double eye image pickup apparatus of the present invention is a double eye image pickup apparatus with a plurality of image pickup systems to perform image pickup with fields thereof at least partly overlapping with each other, which is characterized by provision of:

means for setting a virtual projection plane in a subject space, based on image signals of overlap portions output from the respective image pickup systems; and means for projecting the image signals onto the projection plane to combine the image signals into a single image signal.

For the double eye image pickup apparatus of the present invention, it is preferred that an occlusion portion in the image signals is detected and an image signal corresponding to the occlusion area is projected onto the projection plane in the subject space to be subjected to the process and that, based on position information in the subject space about the image signals, the order of image signals used in the combining process is selected according to the position information.

According to the present invention, an apparatus is arranged with a plurality of image pickup systems to perform image pickup with the fields thereby partly overlapping, in which, using the image signals of overlap portions output from the respective image pickup systems, corresponding points are detected in the overlap portions, position information is obtained for the images of overlapping areas, the subject is projected onto the virtual projection plane in the subject space, based on the position information, the image signals are converted into a single image signal using the information of projection plane and the position information, and an angle of convergence of the image pickup systems is changed, whereby an aspect ratio of image can be arbitrarily changed.

The present invention can provide an image pickup apparatus which can obtain an image at an arbitrary aspect ratio. Further, a high-quality image can be provided by removing a registration shift of the overlapping areas during the combining process. Further, a high-quality image can be obtained without feeling of incompatibility, taking the occlusion areas in image into consideration.

Incidentally, the aforementioned reference, the Institute of Image Electronics, preliminary papers 90-03-04, p23-p28, discloses nothing about a specific method for obtaining a plurality of images by taking a common subject through a plurality of image pickup systems with the fields partly overlapping. Further, the aforementioned Japanese Laid-open Patent Application No. 5-110926 discloses nothing about a method for obtaining an image at an arbitrary aspect ratio by combining a plurality of images with each other. Namely, it fails to show means for specifically constructing the double eye image pickup apparatus as shown in FIG. 25. If the previously described aspect ratio conversion method for trimming upper and lower margins or left and right margins of screen upon output is employed as the aspect ratio conversion method used in such a double eye image pickup apparatus, a problem of degradation of image quality occurs.

It is thus another object of the present invention to provide a double eye image pickup apparatus which can obtain an image at an arbitrary aspect ratio while minimizing the degradation of image quality.

A double eye image pickup apparatus of the present invention is a double eye image pickup apparatus which can produce an image at an arbitrary aspect ratio by combining a plurality of images obtained by taking a common subject through a plurality of image pickup systems with the fields partly overlapping, characterized by provision of:

an image combination conversion processing portion for combination-converting a plurality of image signals output from the plurality of image pickup systems, setting virtual image pickup systems a position of a visual point and directions of optical axes of which are defined by a positional deviation amount of the visual point from the plurality of image pickup systems and a convergence angle of the optical axes, into image signals output from the virtual image pickup systems with arbitrary object distance and imaging magnification.

The apparatus may comprise:

a calculation control portion for determining a control target value of a convergence angle so that a combination-converted image has a predetermined aspect ratio, according to optical parameters at least representing an imaging magnification and an object distance of said plurality of image pickup systems;

a convergence angle control portion for performing the convergence angle control according to an output signal from the calculation control portion; and a drive portion for rotation-driving an optical axis of at least one image pickup system out of said plurality of image pickup systems according to an output signal from the convergence angle control portion.

Also, the apparatus may be so arranged that:

said plurality of image pickup systems each are arranged as an image pickup system having a zooming function; and that the calculation control portion performs a convergence angle control of said plurality of image pickup systems so that the aspect ratio of the combination-converted image is kept constant in zooming said plurality of image pickup systems.

Since the double eye image pickup apparatus of the present invention is provided with the image combination conversion processing portion for performing such a combination-converting process of a plurality of image signals output from the plurality of image pickup systems that, setting the virtual image pickup systems a position of a visual point and directions of optical axes of which are defined by a positional deviation amount of the visual point from the plurality of image pickup systems and a convergence angle of the optical axes, image signals are output from the virtual image pickup systems with arbitrary object distance and imaging magnification, the images obtained by the plurality of image pickup systems with convergence can be combined into an image on a virtual image plane. The apparatus can provide a combined image corrected in distortion caused by convergence.

Further, since the apparatus is provided with the calculation control portion for determining the control target value of convergence angle so that the combination-converted image has a predetermined aspect ratio, according to optical parameters at least representing an imaging magnification and an object distance of the plurality of image pickup systems, and the convergence angle control portion for controlling the convergence angle according to an output signal from the calculation control portion, the convergence control angle which determines the aspect ratio of the combined image is determined by the imaging magnification and object distance, so that the combined image can be obtained at an arbitrary aspect ratio.

Further, the present invention can reveal the following effects.

(1) Since a plurality of image signals output from the plurality of image pickup systems can be used in such a combination-converting process that, setting the virtual image pickup systems the position of the visual point and the directions of optical axes of which are defined by a positional deviation amount of the visual point from the plurality of image pickup systems and a convergence angle of the optical axes, the image signals are converted into image signals output from the virtual image pickup systems with arbitrary object distance and imaging magnification, the apparatus can provide a combined image corrected in distortion caused by convergence while minimizing the degradation of image quality of the combined image.

(2) Since the control target value of convergence angle can be determined so that a combination-converted image has a predetermined aspect ratio, according to optical parameters at least representing an imaging magnification and an object distance of the plurality of image pickup systems, and the convergence angle control can be carried out according to the determined control target value of convergence angle, the apparatus can provide a combined image at an arbitrary aspect ratio.

(3) Since the convergence angle control of the plurality of image pickup systems can be carried out so that the aspect ratio of combination-converted image is kept constant in zooming the plurality of image pickup systems, the convergence control can be carried out as to follow in zooming, whereby the aspect ratio can be kept constant without feeling of incompatibility.

DETAILED DESCRIPTION OF THE PREFERRED EMBODIMENTS

Figure 3:
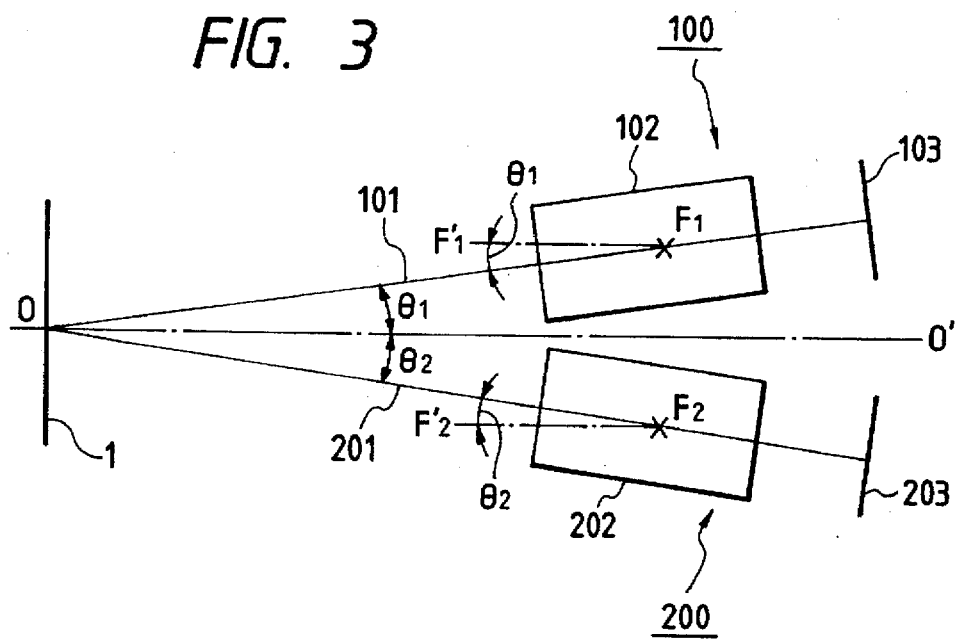
FIG. 3 is a drawing to show a basic layout of the double eye image pickup system in the first embodiment according to the present invention.

First described with FIG. 3 is a basic arrangement of a double eye image pickup system according to the first embodiment of the present invention. In FIG. 3, reference numeral 1 denotes a first subject, and 102 and 202 denote first and second image pickup optical systems having equivalent specifications, which are normally zoom lenses.

Numerals 103 and 203 designate image sensors having equivalent specifications, similarly, which are image pickup tubes such as Saticon or solid state image sensing devices such as CCD. (Although FIG. 3 diagrammatically shows the image sensors of a single plate type (or a single tube type) for brevity, the generality is not lost if the image sensors are arranged in the form of two plate type (two tube type) through a color separation optical system.)

The optical axes 101 and 201 of the systems cross each other on the first subject, so that the image pickup systems are arranged as inclined at $\theta_1$ and $\theta_2$ relative to reference lines $F_1-F_1'$ and $F_2-F_2'$ of rotational angle, each passing through the rotational center of image pickup system. Here, $\theta_1$ and $\theta_2$ are arranged and controlled so as to be always equal to each other. Defining $\theta_1$ and $\theta_2$ as an angle of convergence, images are picked up while changing the angle of convergence in accordance with a change in subject distance. The image pickup is conducted at an arbitrary aspect ratio, utilizing a change of overlap area with the change in angle of convergence.

Figure 2:
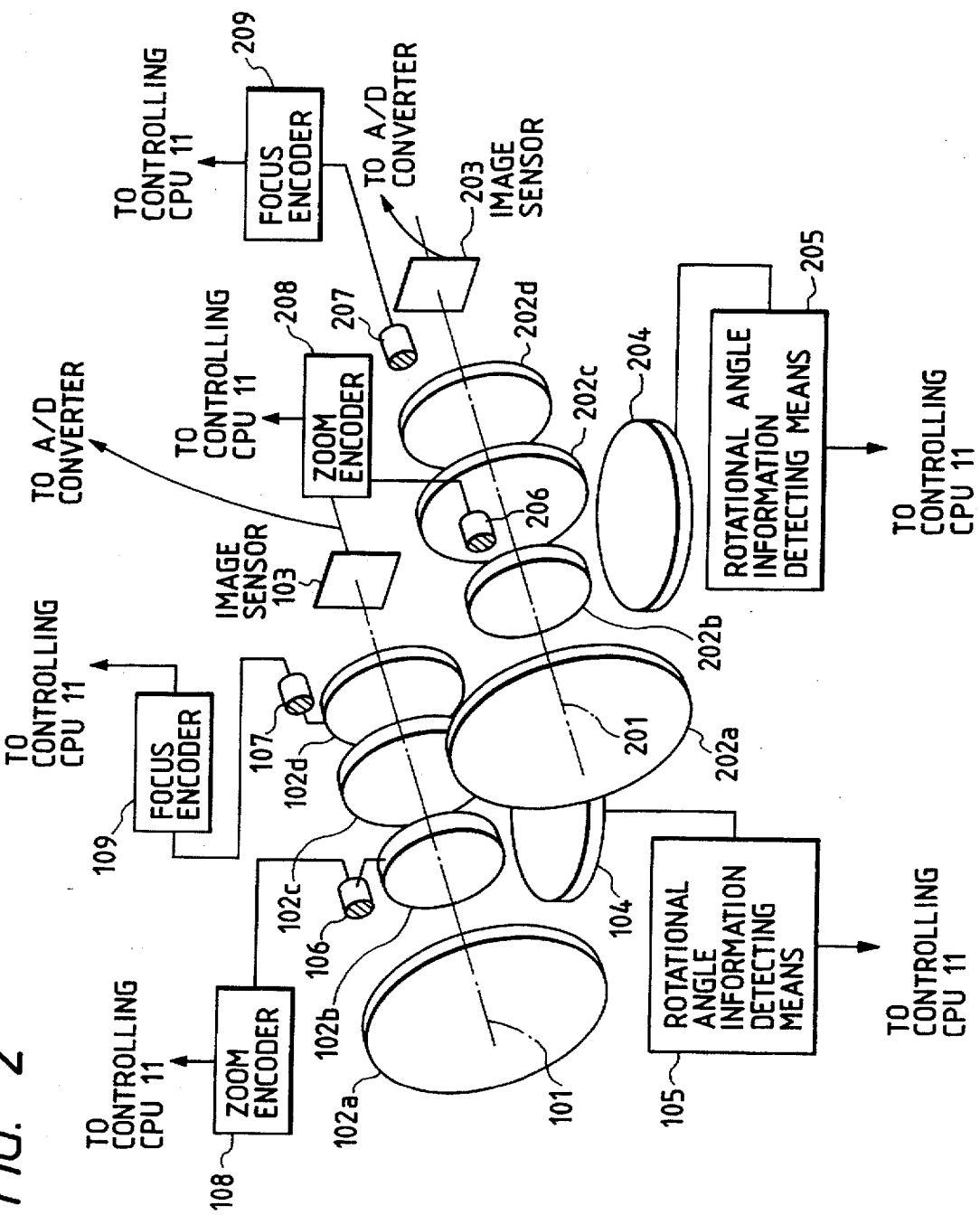
FIG. 2 is a drawing to show a basic layout of the double eye image pickup optical system in the first embodiment according to the present invention.

Next described with FIG. 2 is the constitution and functions of the double eye image pickup system according to the first embodiment of the present invention.

In FIG. 2, 102a, 102b, 102c, 102d and 202a, 202b, 202c, 202d represent lens groups constituting first and second image pickup systems 102 and 202, among which 102b, 202b are zooming lens groups and 102d, 202d are focusing lens groups. Further, 106 and 206 are drive systems (zoom motors) for driving the zooming groups 102b and 202b, and, similarly, 107 and 207 are drive systems (focus motors) for driving the focusing groups 102d and 202d. There are mechanical systems not shown, and drive systems (convergence angle motors) 104 and 204 for rotating 102 and 103, 202 and 203 together in a plane including the optical axes 101 and 201. Rotational angle information detecting units 105 and 205 are provided for detecting information about the rotational angle. The detecting units may be constructed as external members such as rotary encoders, or as systems in which a drive system itself can obtain angle information by a driving method, for example as pulse motors. The angle of convergence of the optical systems is obtained from signals from these detectors. Numerals 108 and 208 denote encoders (zoom encoders) each for obtaining position information along the direction of the optical axis of each lens group in the zooming group 102b or 202b in the image pickup optical system. The focal length f of the image pickup optical system 102 or 202 is obtained from a signal from the corresponding encoder.

Similarly, 109 and 209 are encoders (focus encoders) each for obtaining position information along the direction of the optical axis of each lens group in the focusing group 102d or 202d in the image pickup optical system. These encoders may be external members such as potentiometers or systems in which a drive system itself can obtain position information along the direction of the optical axis of lens by a driving method, for example like a pulse motor.

Here, the zooming group 102b in the image pickup optical system of FIG. 2 is provided with the encoder (zoom encoder) 108 for preliminarily obtaining position information along the direction of the optical axis of the lens group, and the focal length f of image pickup optical system 102 is obtained from a signal from the encoder 108. Similarly, the focusing group 102d in the image pickup optical system is also provided with the encoder (focus encoder) 109 for obtaining position information along the direction of the optical axis of the lens group, and an imaging magnification β of image pickup optical system 102 is obtained from a signal from the encoder 109 together with the signal from the zoom encoder 108. The image pickup optical system 201 has the same structure and functions.

A control microcomputer (as will be referred to as "controlling CPU") 11 separately controls the drive systems 106, 107, 206, 207 with the signals from the encoders 108, 109, 208, 209, whereby two sets of focal lengths f and imaging magnifications β of the image pickup optical systems 102 and 202 are always kept coincident.

Figure 1:
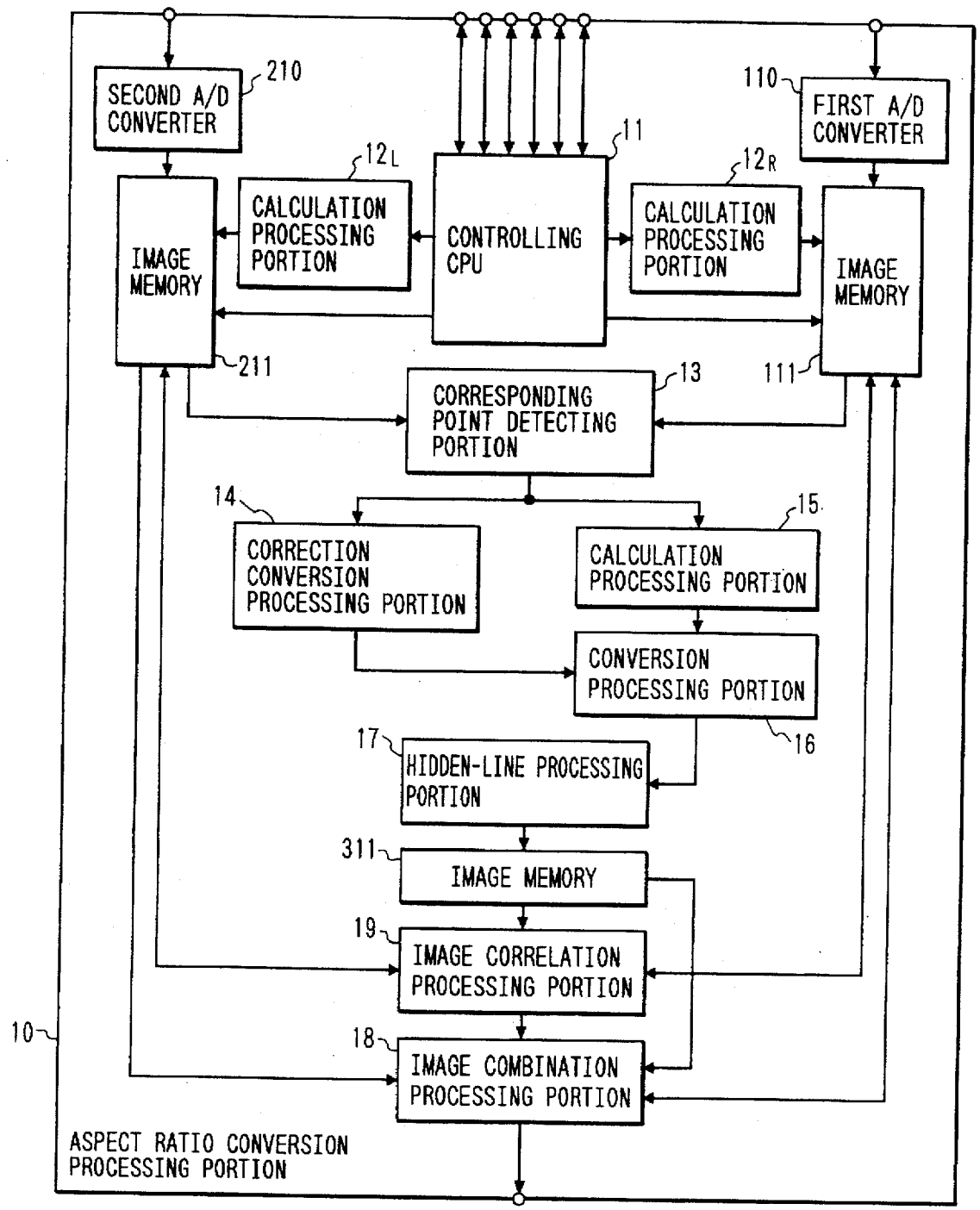
FIG. 1 is a drawing to show an aspect ratio conversion processing portion in a double eye image pickup system in the first embodiment according to the present invention.

The construction of an aspect ratio conversion processing portion 10 is next described with FIG. 1. The aspect ratio conversion processing portion is composed of A/D converters 110, 210 for converting analog video signals output from the image sensors 103 and 203 into respective digital video signals, image memories 111, 211 for storing the digital signals output from the corresponding A/D converters 110, 210, calculation processing portions 12L, 12R for reconstructing an epipolar line of each video signal, a corresponding point detecting portion 13 for detecting corresponding points in the video signals, a correction conversion processing portion 14 for detecting a three-dimensional position corresponding to each video signal, based on corresponding point detection signals obtained by the corresponding point detecting portion and parameters of the image pickup systems, a calculation processing portion 15 for making an estimation of occlusion area in an overlap portion, a conversion processing portion 16 for projecting an image of an occlusion area onto a virtual projection plane, a hidden-line processing portion 17 for writing video signals successively from the far field into an image memory, based on three-dimensional position information and information of the projection plane, an image memory 311, an image combination processing portion 18 for producing an image from the digital video signals stored in the memories 111, 211 and 311 to output a signal of the produced image to the outside, an image correlation processing portion 19 for performing a correlation operation of images with the digital video signals stored in the image memories 111, 211 and 311, and a controlling CPU 11 for performing various controls based on calculation results supplied from the image correlation processing portion 15.

Figure 4:
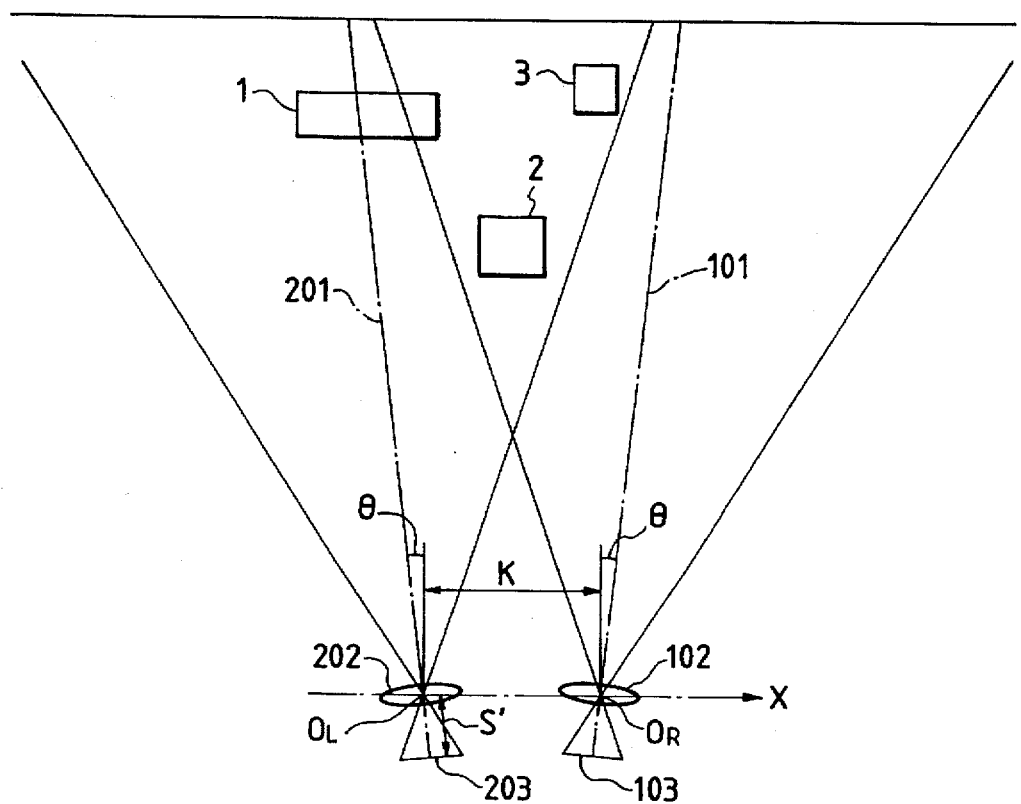
FIG. 4 is a drawing to show an outline of image input through the double eye image pickup system in the first embodiment according to the present invention.

The operation of the aspect ratio conversion processing portion 10 according to the present invention is next described referring to FIG. 1 and FIG. 4. In FIG. 4, the double eye image pickup apparatus according to the present invention is taking images of subjects 1, 2 and 3 with the optical systems being kept at a convergence angle θ. The aspect ratio conversion processing portion 10 performs a conversion process to convert an analog video signal supplied from each image sensor 103, 203 into a digital signal in the first or second A/D converter 110, 210. The controlling CPU 11 receives detection signals from the encoders 108, 208 and 105, 205 in the image pickup optical systems 102 and 202, to perform such a control that the focal lengths, imaging magnifications and convergence angles are always kept coincident between the image pickup optical systems. The analog video signals input into the respective image sensors 103 and 203 are converted into digital video signals in the first and second A/D converters 110 and 210, which are temporarily stored in the respective image memories 111 and 211.

Figure 6A:
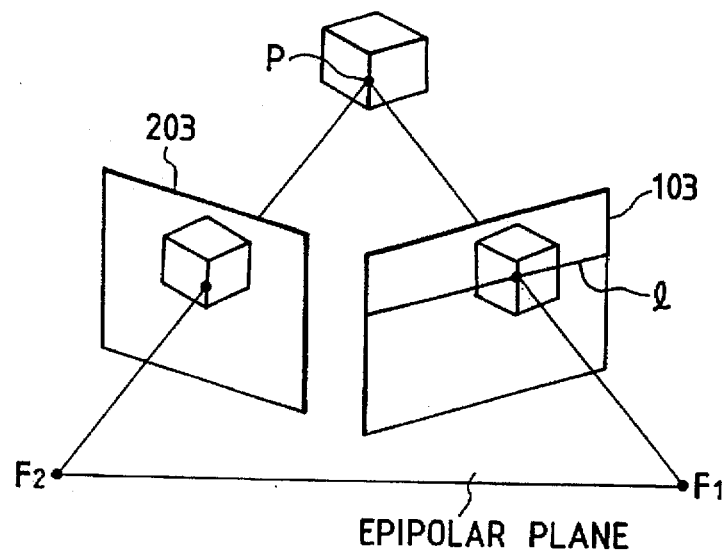
FIGS. 6A and 6B are schematic diagrams of epipolar line(s)

The corresponding point detecting portion 13 performs an extraction process of corresponding points using the video signals stored in the image memories 111 and 211. FIG. 6A diagrammatically shows a relation between the convergence and corresponding points. In FIG. 6A, $F_1$ and $F_2$ are rotation centers of the image pickup systems 102 and 202, and 103 and 203 are sensor surfaces. For convenience sake of illustration, the sensor surfaces 103 and 203 are placed in front of $F_1$ and $F_2$. A plane defined by three points of $F_1$, $F_2$ and P is called as an epipolar plane, and an intersection 1 between the epipolar plane and the sensor surface 103 is called as an epipolar line. If a corresponding point to point P is desired to be searched on the sensor surface, the search can be done only on the epipolar line 1 on the sensor surface 103. However, the epipolar line is an oblique line due to the convergence effect, and, therefore, the epipolar line 1 must be reconstructed in order to perform the search of corresponding point in a smooth manner.

Figure 6B:
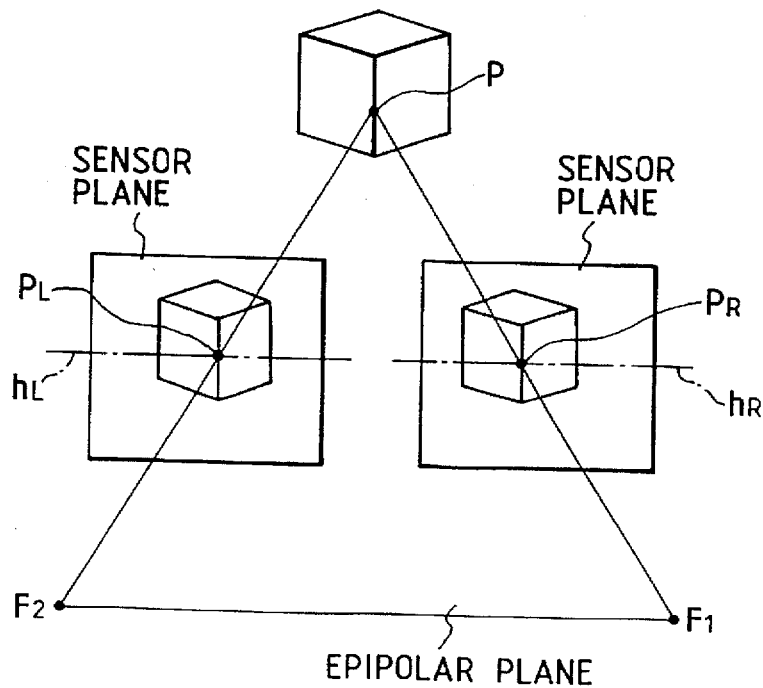

Because the epipolar lines of images focused on the image sensors 103 and 203 as shown in FIG. 4 are inclined as described above, the epipolar lines are reconstructed in the calculation processing portions 12L and 12R to be converted into horizontal lines as shown in FIG. 6B. An applicable conversion method is one as disclosed in (Fumiaki Tomita and Hironobu Takahashi), "Measures based on boundary line expression of stereo image", Institute of Electronics, Information and Communication Engineers of Japan, papers D Vol. J71-D, No. 6, pp 1074–1082. The reconstruction of epipolar line is such a conversion process that an image taken through a system in the arrangement as shown in FIG. 4 is converted into an image as taken through a system in the arrangement shown in FIG. 7.

Figure 5:
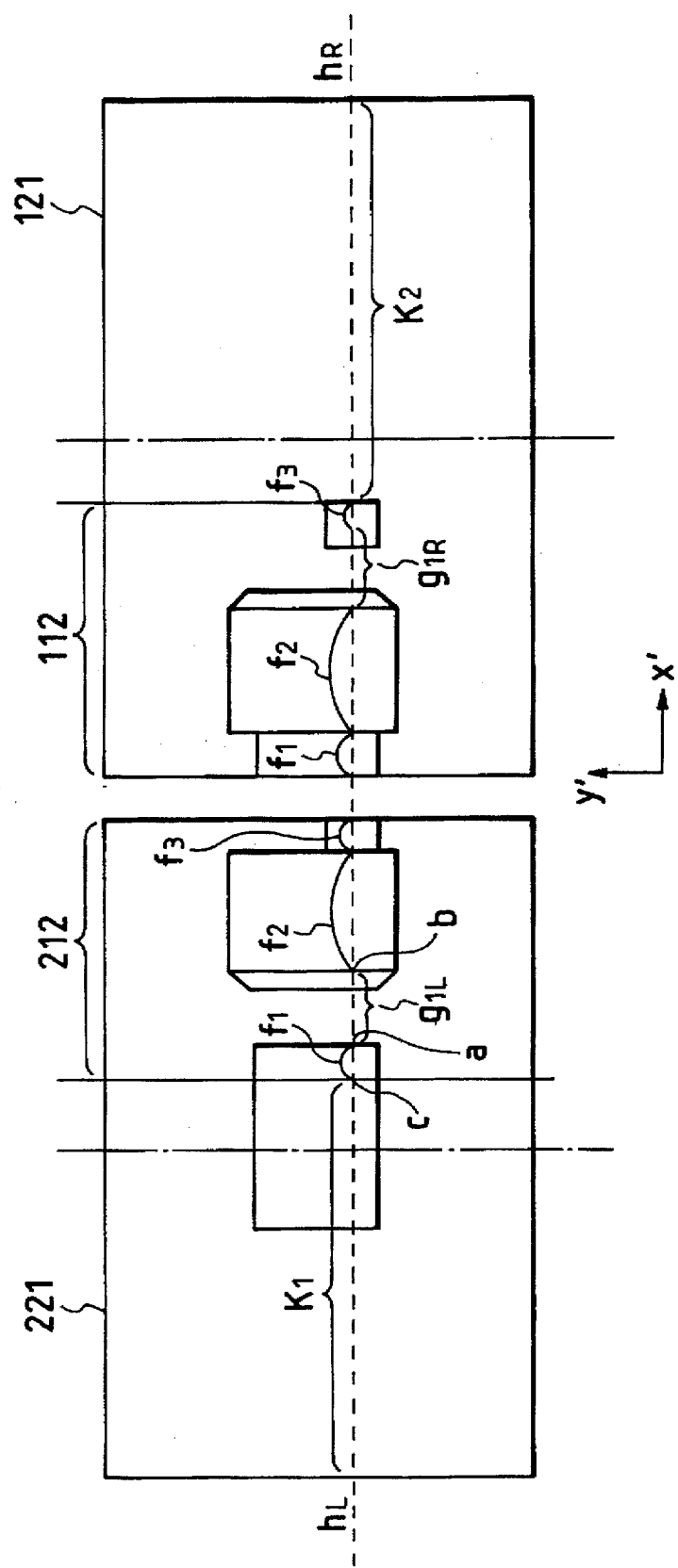
FIG. 5 is a drawing to show reconstruction of epipolar line for images obtained by the double eye image pickup system in the first embodiment according to the present invention.

The video signals converted in the calculation control portions 12L and 12R are again written in the image memories 111 and 211. FIG. 5 schematically shows the images 121 and 221 obtained after the subjects shown in FIG. 4 were taken through the image pickup optical systems and the reconstruction of epipolar line was carried out for them.

The corresponding point detecting portion 13 first performs the correlation calculation process between the images 121 and 221, detects an overlap area, and thereafter detects corresponding points using an image in the detected overlap area. For example, the following calculation formula is used for the correlation calculation.

$$\Gamma(x_0') = \int q_1(x',y') \cdot q_2(x'+x_0',y') dx' dy' \quad (1)$$

where x' is a coordinate in a direction within the plane of the drawing, $q_1$ is an intensity distribution of an image taken by the image pickup optical system 102, and $q_2$ is an intensity distribution of an image taken by the image pickup optical system 202.

Overlap areas 112 and 212 are detected based on coordinates providing the maximum correlation value function $\Gamma(x_0')$ in formula (1).

The corresponding point detecting portion 13 detects corresponding points between the images after the reconstruction of epipolar line. As shown in FIG. 6B, the reconstructed epipolar lines are horizontal. Ignoring the effect of detection errors, the detection of corresponding points can be done between the video signals on a common horizontal line, for example on $h_L$ and $h_R$ in FIG. 6B.

One of the detection methods of corresponding points is the template matching method. This method determines corresponding points such that a template is set around a point in a right image and corresponding points are determined by comparison of similarity in a left image with respect to an image of the template. The corresponding point detecting portion 13 takes a cross-correlation between a pixel value in the image of template and pixel values in the searching image, as expressed by below formula (2), and determines coordinates to show a maximum value as coordinates of a corresponding point. The maximum value of cross-correlation of formula (2) is 1.

$$\sigma(x',y') = \frac{\Sigma\{R(x'-i,y'-j) \cdot L(x'-i,y'-j)\}}{\sqrt{\Sigma L^2(x'-i,y'-j)} \cdot \sqrt{\Sigma R^2(x'-i,y'-j)}} \quad (2)$$

In above formula (2), L and R represent pixel values in the epipolar-line-reconstructed images 121 and 221, and $\sigma(x',y')$ the degree of correlation. Also, x', y' represent coordinate values.

The corresponding point detecting portion 13 extracts coordinates corresponding to each pixel value in image 221 from the image 121 by the above-described process and supplies the coordinate values of corresponding points to the correction converting portion 14. The correction converting portion 14 performs a coordinate conversion process based on coordinate values in the image 121 corresponding to the pixel values in the image 221 obtained in the corresponding point detecting portion 13.

Figure 7:
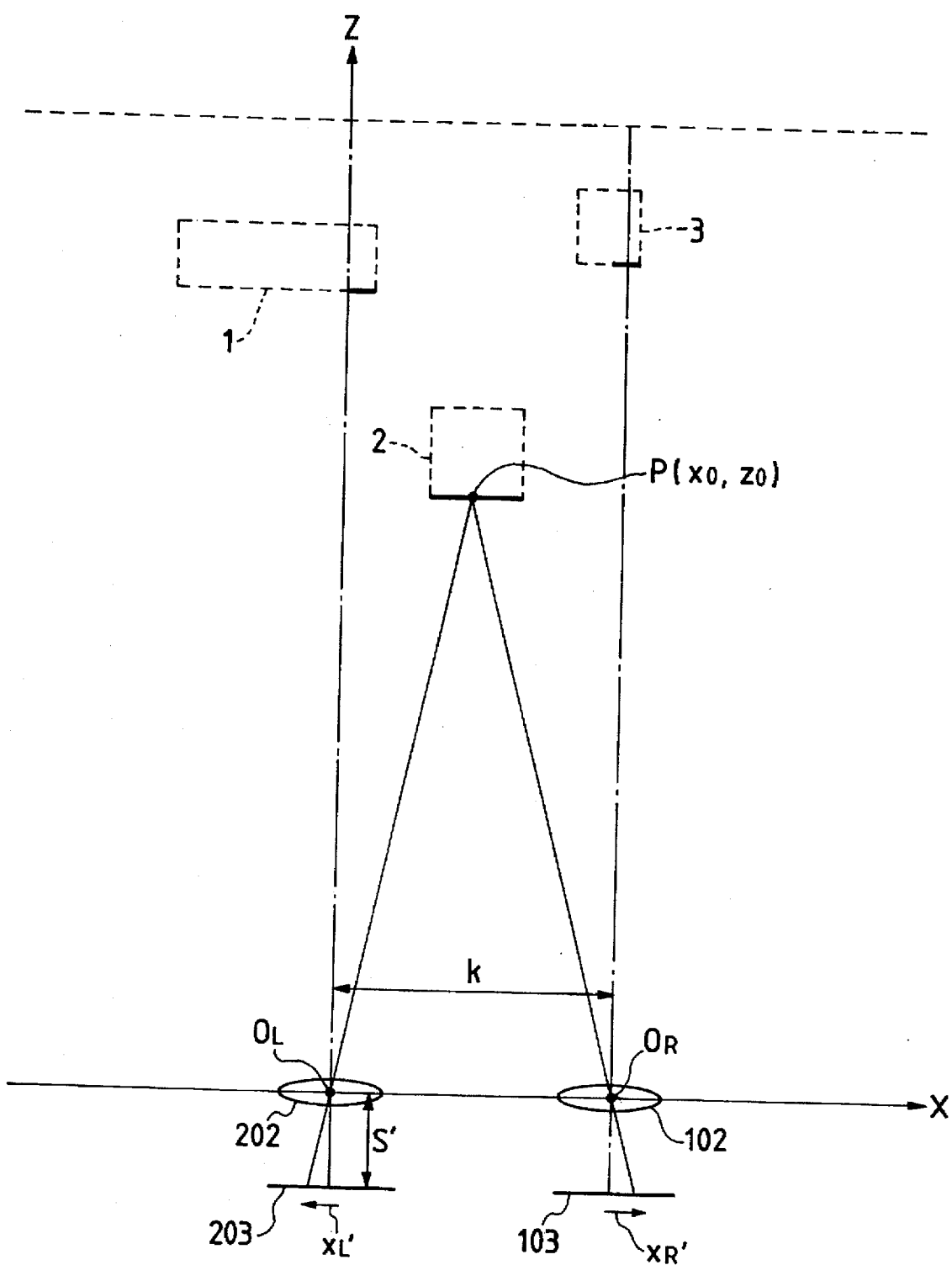
FIG. 7 is a drawing to show an outline of a reconstruction process of epipolar line.

The epipolar-line-reconstructed images are equivalent to images taken by the systems arranged as shown in FIG. 7, and, therefore, the following description is based on the arrangement as shown in FIG. 7.

The correction conversion processing portion 14 performs the following calculation to calculate, based on the principle of triangulation, a position of a point, for example point P ($x_0, z_0$) in FIG. 7, using a baseline length K, coordinates $x_r'$ and $x_L'$ of a corresponding point, and a distance S' from the rear principal point of lenses to the sensor surface.

$$x_0 = -Kx_L'/(x_R' - x_L')$$
$$z_0 = -KS'/(x_R' - x_L') \quad (3)$$

The coordinates are defined with the origin at the lens center $O_L$ of the image pickup optical system 202 and the x axis and the z axis being set as shown in FIG. 7.

The calculation processing portion 15 detects an occlusion area in the overlap portions in the images, based on detection signals from the corresponding point detecting portion 13.

As shown in FIG. 5, the epipolar lines $h_R$ and $h_L$ are horizontal in the epipolar-line-reconstructed images 121 and 221. The corresponding point extraction is executed based on formula (2) along the epipolar lines, as described above.

There is, however, no corresponding point detected for an image of the occlusion area. In more detail, no corresponding points are present on the epipolar line $h_R$ to an image area $g_{1L}$ on the epipolar line $h_L$ in FIG. 5. Therefore, corresponding points cannot be determined for the area $g_{1L}$. It is thus impossible to calculate information of three-dimensional position even if the image of occlusion area is input into the correction conversion processing portion 14. Then another process is necessary for the image of occlusion area.

Figure 14:
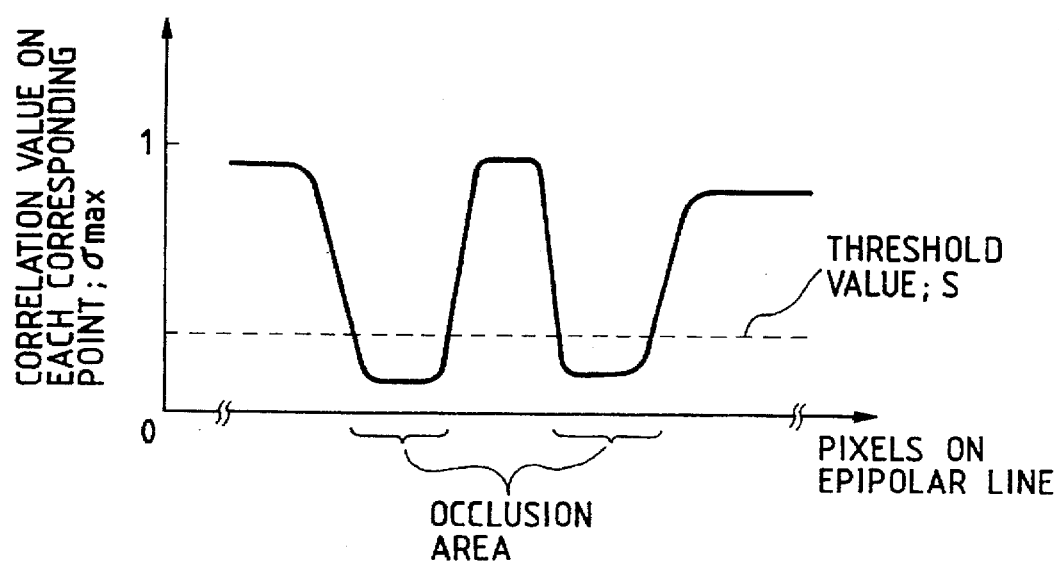
FIG. 14 is a drawing to illustrate an outline of an occlusion area detection.

In order to process the above image of occlusion area, the calculation processing portion 15 first extracts an occlusion area from the images. The extraction can be executed by the following method. For example, correlation values $\sigma_{max}$ (x',y') at corresponding points obtained by the formula (2) are evaluated with respect to a threshold value S as shown in FIG. 14, so that areas satisfying $\sigma_{max} < S$ are extracted as occlusion areas.

Transferred to the conversion processing portion 16 is position information of regions having corresponding points obtained in the correction conversion processing portion 14 and image information of occlusion areas extracted by the calculation processing portion 15.

The present embodiment employed the method for detecting corresponding points from the images to obtain the position information, but it is clear that another distance detecting means can be used, such as means for detecting three-dimensional position information of a subject by projecting a beam of infrared rays or a laser beam onto the subject and detecting reflected light from the subject.

The conversion processing portion 16 combines the three-dimensional position information with the image information of occlusion areas to execute mapping of subject information in the overlap portions.

Figure 8:
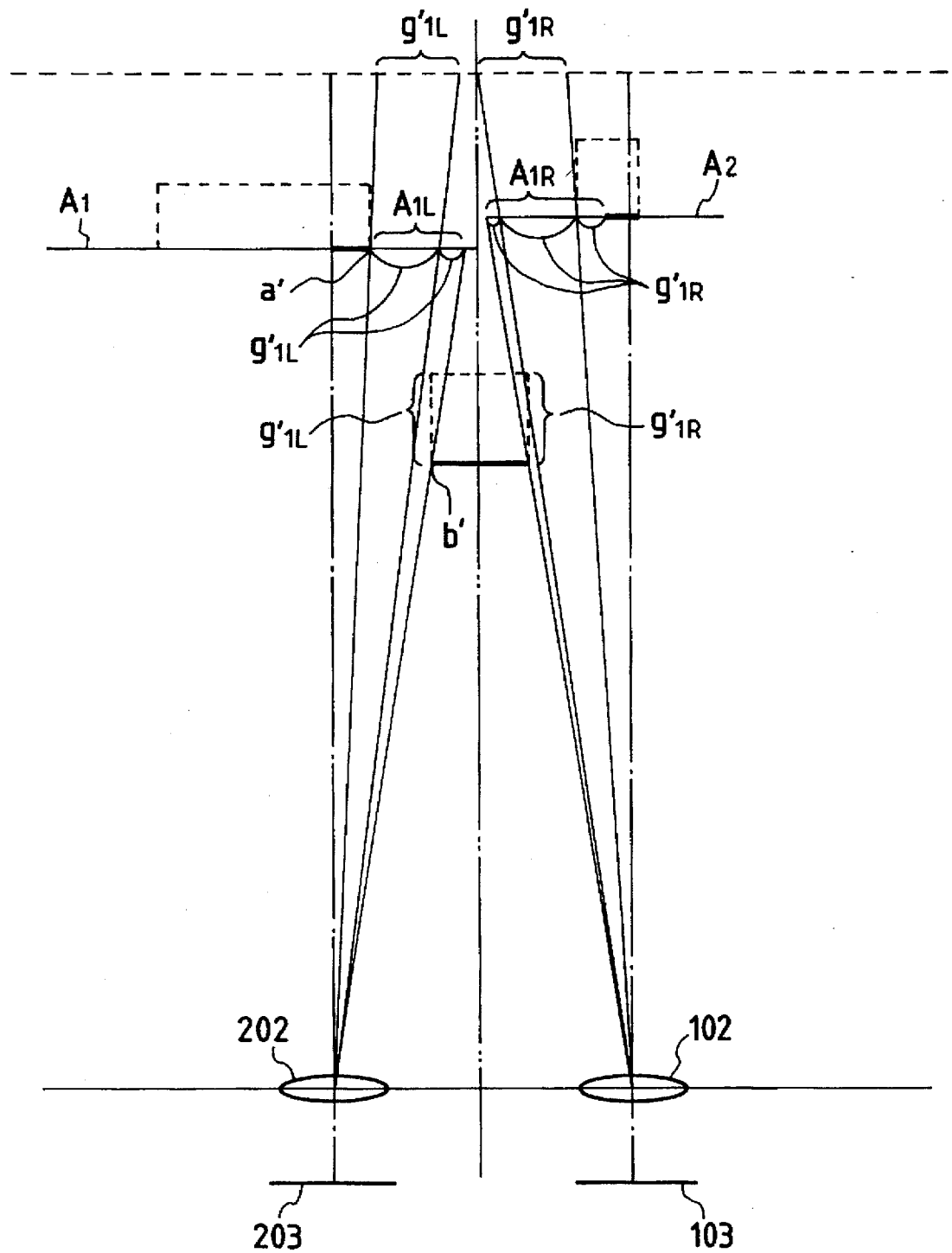
FIG. 8 is a drawing to illustrate an outline of a conversion process of an image in occlusion area.

An outline of the operation is described referring to FIG. 8.

Figure 9:
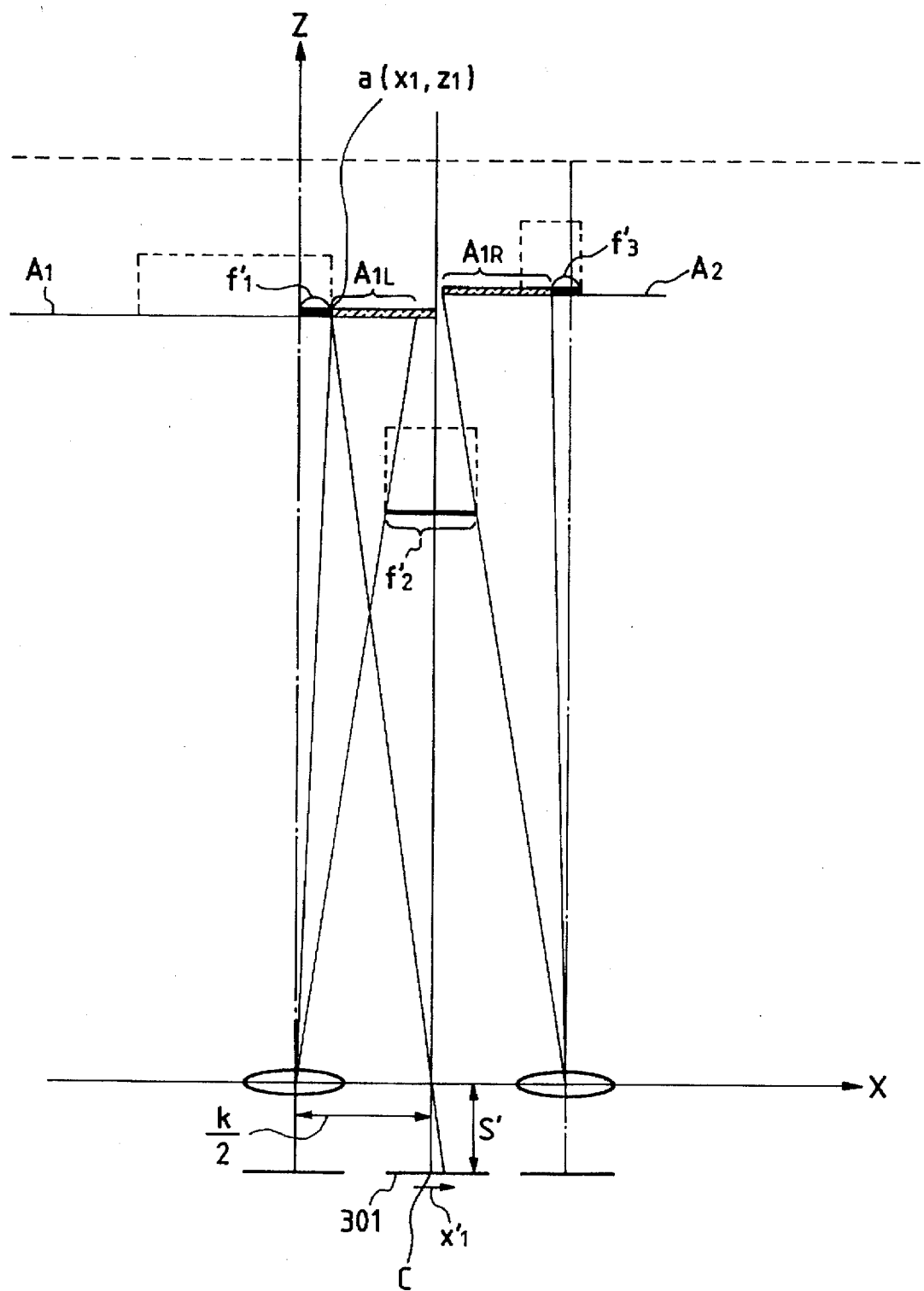
FIG. 9 is a drawing to illustrate an outline of a conversion process of an image in overlap area.

FIG. 8 and FIG. 9 are schematic cross-sectional view of the subjects including the epipolar lines $h_L$ and $h_R$ in FIG. 5. FIG. 8 is a drawing to illustrate the occlusion areas and FIG. 9 a drawing to illustrate an outline of the combination process of images of overlap areas. In FIG. 9, thick lines $f_1'$, $f_2'$ and $f_3'$ represent areas for which the position information was obtained in the correction conversion processing portion 14.

In FIG. 8, $g_{1L}'$ and $g_{1R}'$ indicate subject regions corresponding to the occlusion areas $g_{1L}'$ and $g_{1R}'$ in FIG. 5, for which the position information was not attained, as described previously. It is, however, necessary to combine images as taking the images of occlusion areas into consideration in order to produce an aspect-ratio-converted image. In the present embodiment the combination process is carried out by the following method. First, three-dimensional position information of two points at the both ends of each occlusion area, for example three-dimensional position information a' and b' (see FIG. 8) corresponding to two points a, b, is extracted from the images shown in FIG. 5, choosing a farther point out of the two points a' and b'. Since the point a' is located at a farther position in case of FIG. 8, the point a' is extracted. Then a virtual projection plane (or line) $A_1$ including the point a' is set, and the subject area $g_{1L}'$ corresponding to the occlusion area is projected onto the projection plane $A_1$. Namely, the image information of the occlusion area $g_{1L}'$ in FIG. 5 is fit into an area $A_{1L}$ on the projection plane $A_1$. The same process is executed for the occlusion area $g_{1R}$, so that it is fit into an area $A_{1R}$ on a projection plane $A_2$.

According to the above process, mapping is made in the subject space for the images of the overlap areas 112 and 212 in FIG. 5.

FIG. 9 shows regions corresponding to the images on the epipolar lines $h_L$ and $h_R$ in FIG. 5 as mapped by the conversion processing portion 16.

The hidden-line processing portion 17 performs a conversion process of the images of the overlap portions, based on the mapped image information, to write processed data in the image memory 311. In the process a position C of virtual visual point is first set as shown in FIG. 9. This point may be preliminarily set or externally input. Then setting a virtual sensor plane at the position of visual point, the mapped image information is projected thereonto. For example, a point a ($x_1, z_1$) in FIG. 9 is projected at a position determined by the following formula:

$$x_1' = (k/2 - x_1) \times S'/z_1 \quad (4)$$

where S' is a distance from the lenses to the virtual sensor surface 301. Here, the coordinate axes are the same as those in FIG. 7.

Figure 10:
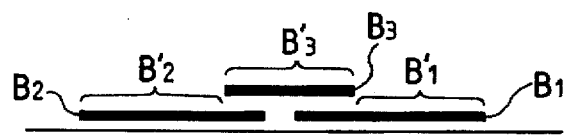
FIG. 10 is a drawing to illustrate an outline of a hidden-line elimination process.

The projection is carried out in order from the farthest subject region onto the sensor surface 301, and the result is written into the image memory 311. In case of FIG. 9, the subject information $f_3'$, $A_{1R}$ on the projection plane $A_2$ is projected onto the virtual sensor surface 301 in accordance with formula (4), and then the result is written into the image memory 311. Next, the subject information $f_1'$, $A_{1L}$ on the plane $A_1$ is projected onto the virtual sensor plane 301 in accordance with formula (4), and then the result is written into the image memory 311. Further, the information $f_2'$ is projected onto the plane 301 in accordance with formula (4), and the result is written into the image memory 311. If there are overlap positions as so projected, later-projected information, i.e., information at a position of smaller z coordinate in FIG. 9, is overwritten over larger x information in the image memory 311. This is diagrammatically shown in FIG. 10. FIG. 10 schematically shows a state of the enlarged virtual sensor surface 301 in FIG. 9 with the subject information projected thereonto. In FIG. 10, $B_1$ is a projected image of the subject information on the projection plane $A_1$, $B_2$ a projected image of the subject information on the projection plane $A_2$, and $B_3$ a projected image of the subject information $f_3$. Thus, the images of $B_1'$, $B_2'$ and $B_3'$ are stored in the image memory 311.

Figure 11:
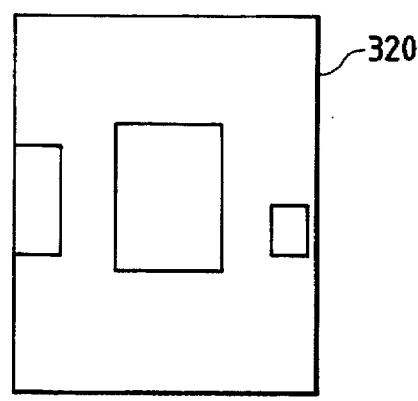
FIG. 11 is a drawing to diagrammatically show an image in overlap area as combination-processed.

FIG. 11 shows an image 320 stored in the image memory 311 after the conversion process in the hidden-line processing portion 17, of the images of the overlap portions.

Figure 12:
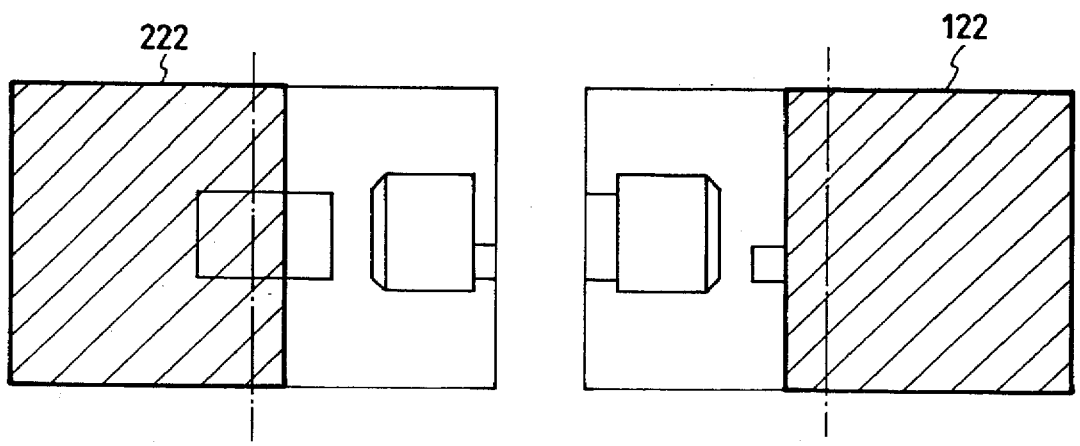
FIG. 12 is a drawing to show an outline of areas used in the combination process.

The image correlation processing portion 19 reads the image information 121, 221, 320 from the image memories 111, 211 and 311, and first performs the correlation calculation, which is the same calculation as formula (1), using the images 121 and 320 to cut a region 122 (FIG. 12) out of the image 121. Then the correlation calculation is performed for the images 221 and 320 to cut a region 222 (FIG. 12) out of the image 221. FIG. 12 schematically shows the cut-out images 122 and 222. The combination processing portion 18 reads the image 122 from the image memory 111 and similarly reads the image 222 from the image memory 211. The combination processing portion 18 combines the two images with the image 320 read from the image memory 311 to produce an image converted in aspect ratio and output it. A seamless process is conducted to make seam lines inconspicuous between the images. Here is a process of smoothing described as an example. This method is executed as follows. A window W (i,j) is set about a certain image f (x',y') and an output obtained by the following calculation is given to a point (x',y').

$$f(x',y') = \sum_{i=j}^{m} \sum_{j=1}^{n} W(i,j)f(x'-i, y'-j) \quad (5)$$

The size of window is m×n, and for example, the following matrix can be used as the window.

$$W = \frac{1}{9} \begin{pmatrix} 1 1 1 \\ 1 1 1 \\ 1 1 1 \end{pmatrix}$$

Figure 13:
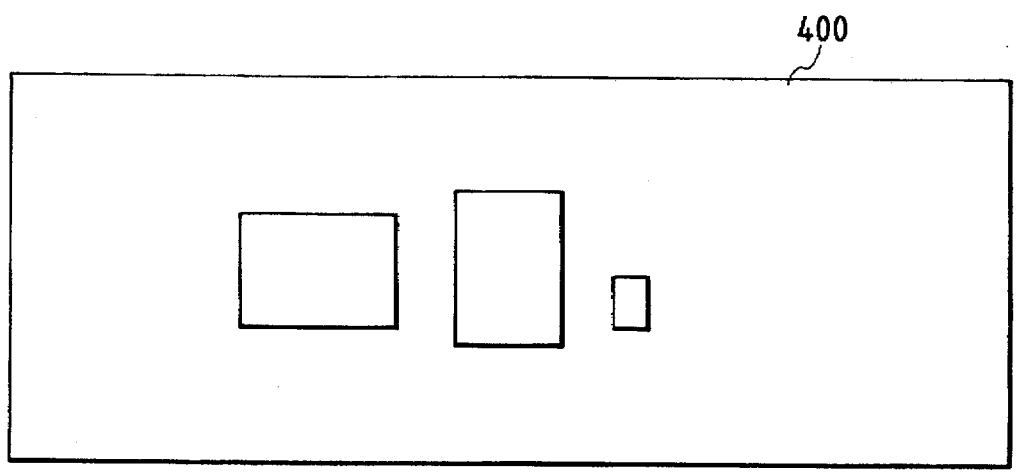
FIG. 13 is a schematic diagram of an image output after the aspect ratio conversion process.

FIG. 13 schematically shows an image 400 as produced by the combination and seamless processes in the combination processing portion 18.

Through the above procedure, an aspect-ratio-converted image is output.

Figure 15:
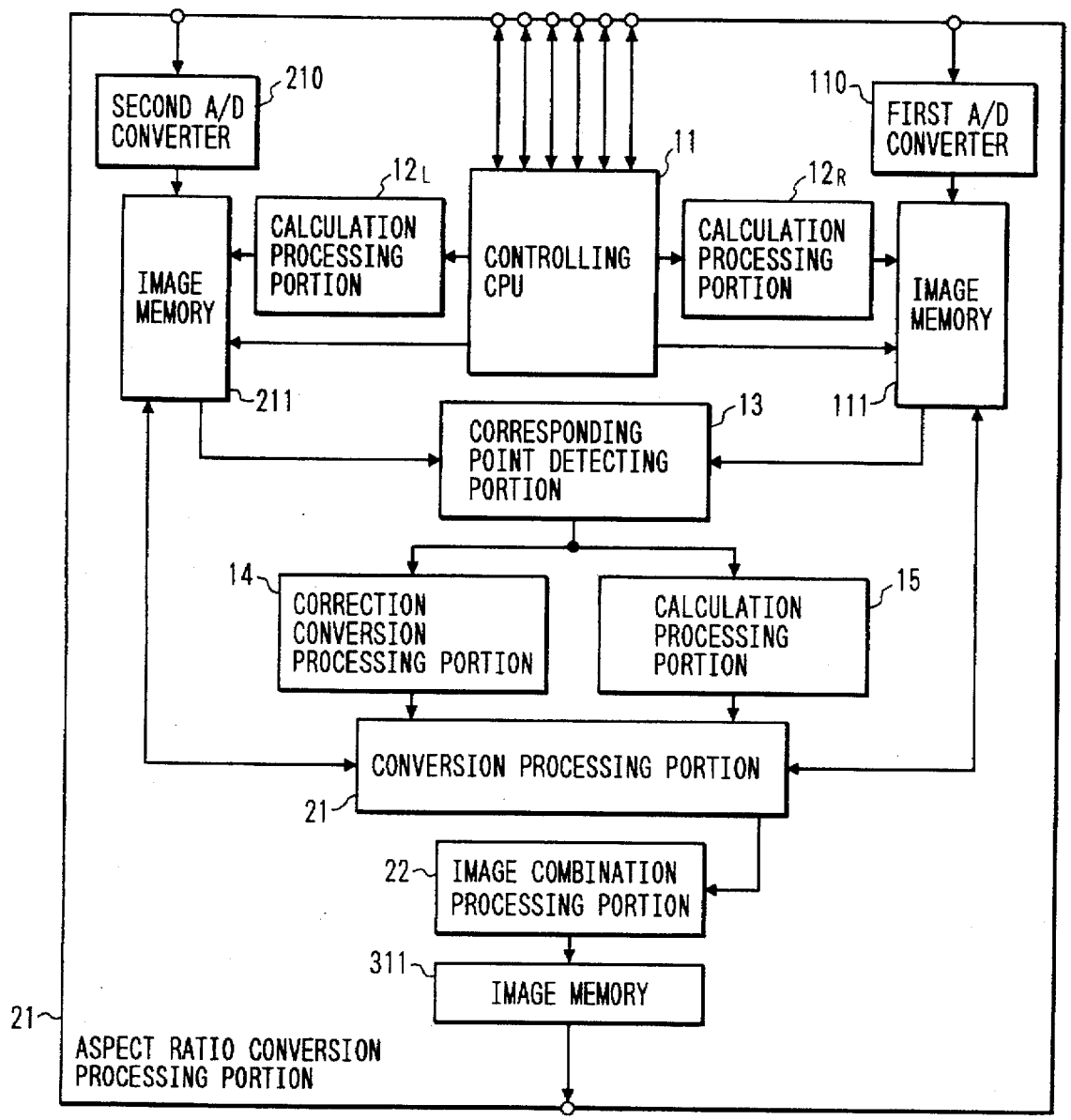
FIG. 15 is a drawing to show an aspect ratio conversion processing portion in the second embodiment of the present invention.

FIG. 15 is a block diagram to show an aspect ratio conversion processing portion 21 in the second embodiment according to the present invention. In FIG. 15, the same members and members with the same functions are denoted by the same reference numerals as those in the aspect ratio conversion processing portion 10 shown in the first embodiment, and are omitted to describe herein. The operation is also omitted because it is the same as that of the first embodiment. Only constituent portions in FIG. 15 different from those in the aspect ratio conversion processing portion 10 as described previously are described in the following.

In FIG. 15, a conversion processing portion 21 receives three-dimensional position information of areas for which corresponding points were obtained by a correction conversion processing portion 14, and image information of occlusion areas obtained by a calculation processing portion 15, and sets a virtual projection plane in a subject space to map the subject information therein.

The operation of the conversion processing portion 21 is next described.

Figure 16:
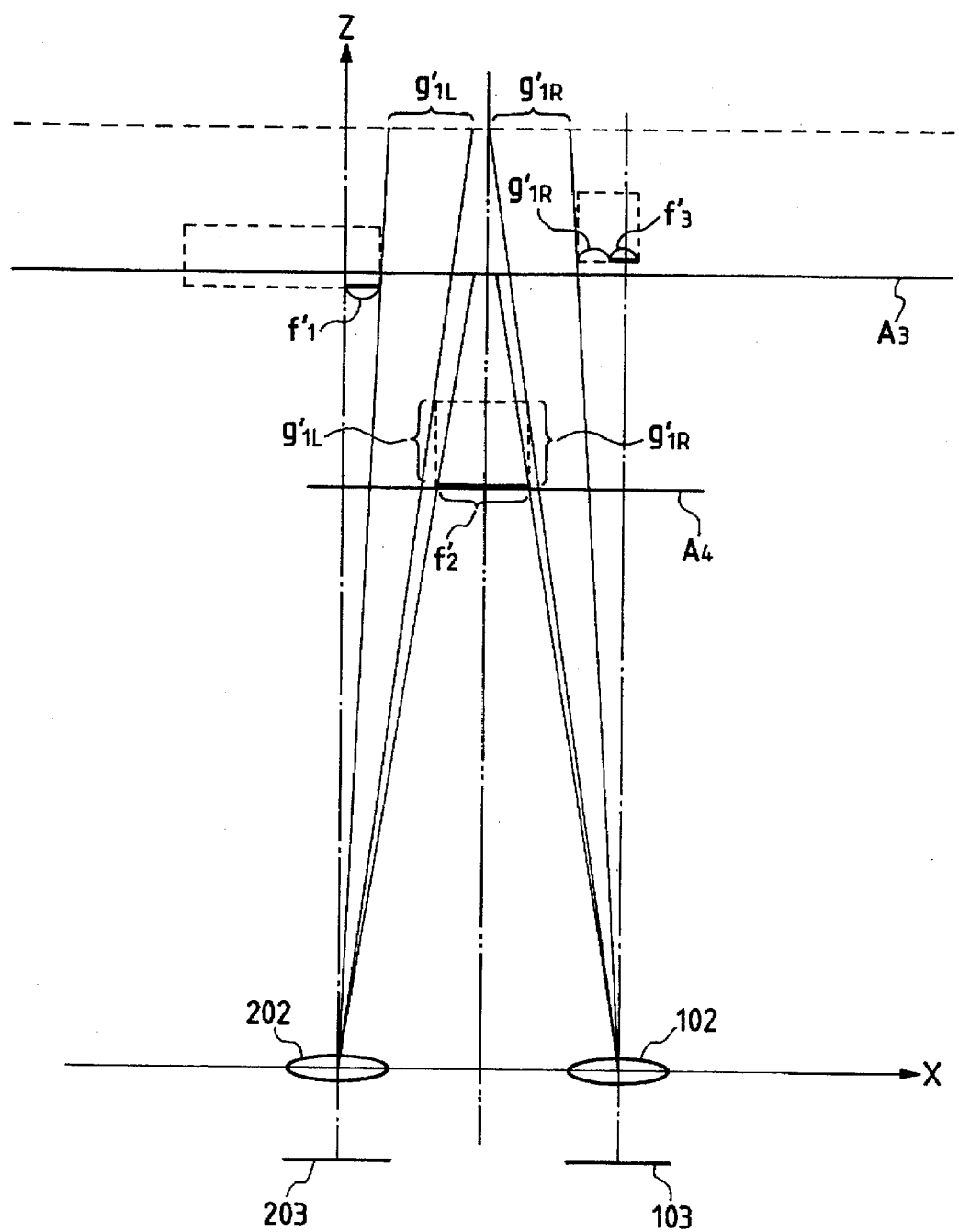
FIG. 16 is a drawing to show an outline of image conversion in the second embodiment according to the present invention.
Figure 17:
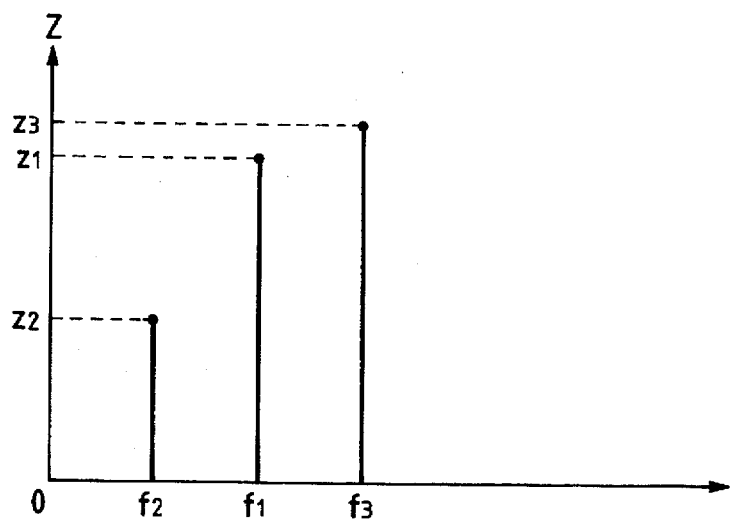
FIG. 17 is a drawing to illustrate a setting method of a second virtual projection plane according to the present invention.

FIG. 16 is a drawing obtained by mapping the regions for which corresponding points obtained in the correction conversion processing portion 14 are present, in the subject space. The conversion processing portion 21 sets a virtual projection plane, based on depth coordinates (z coordinates) of regions $f_1'$, $f_2'$, $f_3'$ for which corresponding points were obtained. A method to determine the setting position may be one to arrange the regions $f_1'$, $f_2'$, $f_3'$ in order from the smallest z coordinate, for example as shown in FIG. 17.

Then, a difference of z coordinate between the regions, for example $z_1-z_2$ or $z_3-z_1$, is obtained and a threshold value T is set for the difference.

If $|z_3-z_1|<T$, the regions $f_1'$ and $f_3'$ are deemed as being in a same zone and provided with a same label.

In case of the arrangement shown in FIG. 16 where the regions $f_1'$ and $f_3'$ are given a same label, a virtual projection plane $A_3$ is set at a position of $(z_3+z_1)/2$. A projection plane $A_4$ is set at a position of $z_2$ for the region $f_2'$.

Figure 18:
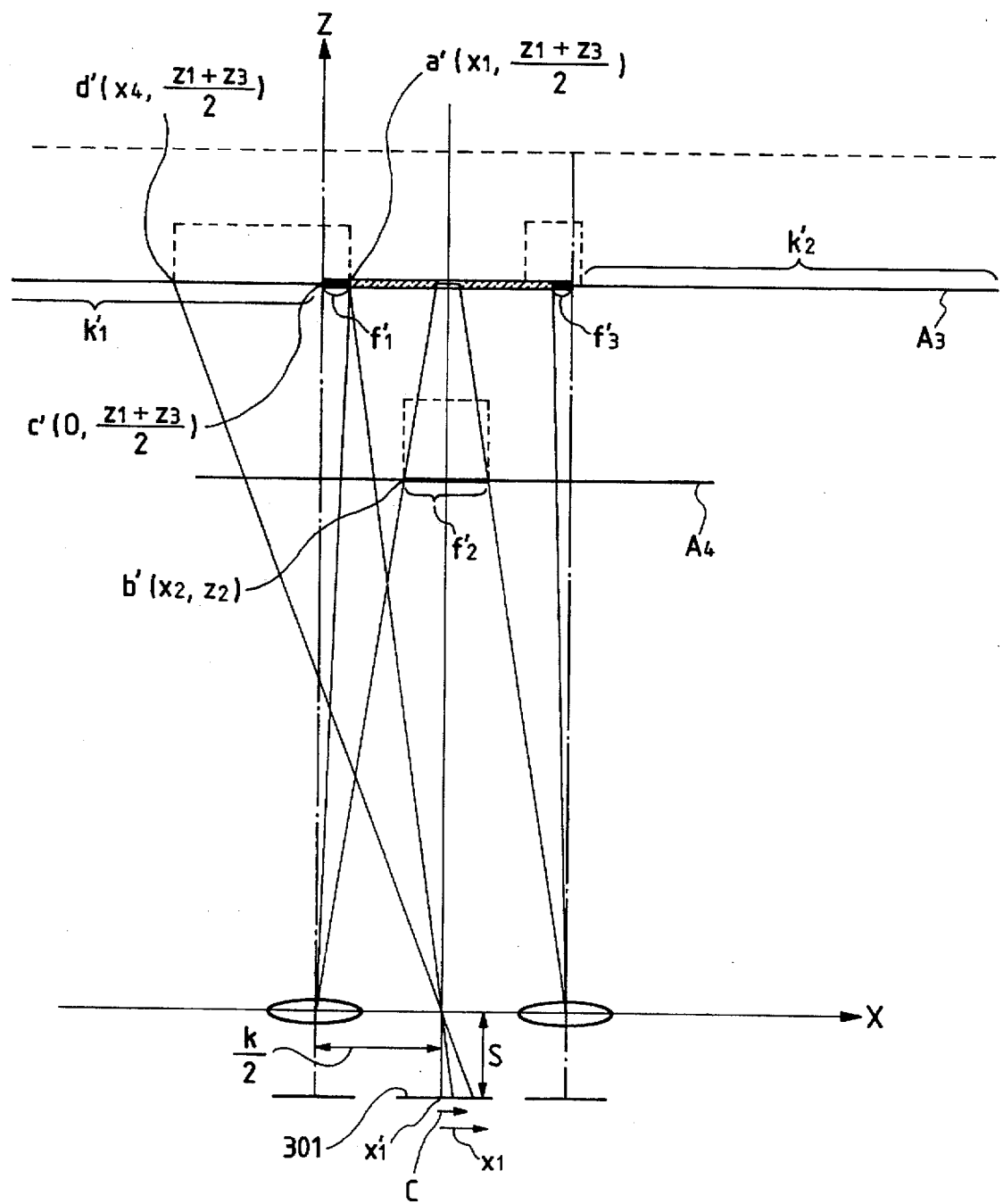
FIG. 18 is a drawing to show an outline of a second combining process according to the present invention.

Then the regions $f_1'$ and $f_3'$ for which corresponding points were obtained are projected onto the projection plane $A_3$. The conversion processing portion 21 receives information of occlusion areas from the calculation processing portion 15 and, similarly as in the first embodiment, it reads z coordinates of two points a and b at the both ends of an occlusion area, for example $g_{1L}$ in FIG. 5, to project the information onto a projection plane located at a z-coordinate position of a farther point out of the two points. FIG. 18 shows an outline of the above process.

Since the regions $f_1'$ and $f_3'$ are projected on the virtual projection plane $A_3$ by the above process, a point a' in the subject space, corresponding to the point a in FIG. 5, is at $(x_1,(z_1+z_3)/2)$. On the other hand, point b' is at $(x_2, z_2)$, so that an image of occlusion area $g_{1L}$ in FIG. 5 is mapped on the farther projection plane $A_3$. Another occlusion area $g_{1R}$ in FIG. 5 is also mapped on the plane $A_3$ by the same process.

Next described is a process for the image regions $k_1$ and $k_2$ as shown in FIG. 5, other than the overlap regions in the images 121 and 221. For illustration purpose, the description concerns the image 221 in FIG. 5.

The mapping of the image area $k_1$ other than the overlap area is as follows. First obtained is a point C' in FIG. 18, which has coordinates in the subject space corresponding to a position of a border between the overlapping area 212 and the non-overlapping area $k_1$, i.e., the point C in FIG. 5. As shown in FIG. 18, the coordinates of point C' are $(0,(z_1+z_3)/2)$. The plane $A_3$ on which the point C' is projected is selected based on the coordinate values, and the image information of area $k_1$ in FIG. 5 is mapped onto the virtual projection plane $A_3$ in FIG. 18. The same process is executed for the area $k_2$ on the image 121 in FIG. 5 to be mapped on a region $k_2'$ in FIG. 18.

All image information of the images 121 and 221 in FIG. 5 is mapped in the subject space by the above serial processing in the conversion processing portion 21.

Following the formula (4) as described in the first embodiment, the combination processing portion 22 projects the subject information mapped on the virtual projection planes $A_3$ and $A_4$ in the conversion processing portion 21, onto a virtual sensor plane 301. A point d' $(x_4,(z_1+z_3)/2)$ in FIG. 18 is projected at the following point on the sensor surface 301 by the formula (4).

$$x_4'=(k/2-x_4)\times 2S'/(z_1+z_3)$$

The mapped subject information is projected onto the virtual sensor surface 301 by the above processing. Namely, the subject information is written into the image memory 311 in accordance with projected positions. As for the information as superimposed on the sensor surface 301, information with smaller z coordinate is overwritten over information with larger z in the image memory 311 similarly as in the first embodiment. After all subject information is written, an aspect-ratio-converted image is output. Although the first and second embodiments employed the method for automatically setting the virtual projection planes based on the position information of subjects, a method for externally inputting the setting positions of projection planes, for example arranging such that a man inputs the positions of projection planes based on the image information, may be also employed.

It is of course that the present invention can be applied to image pickup apparatus for producing a high-definition image by superimposing a plurality of obtained images over the entire area.

Figure 19:
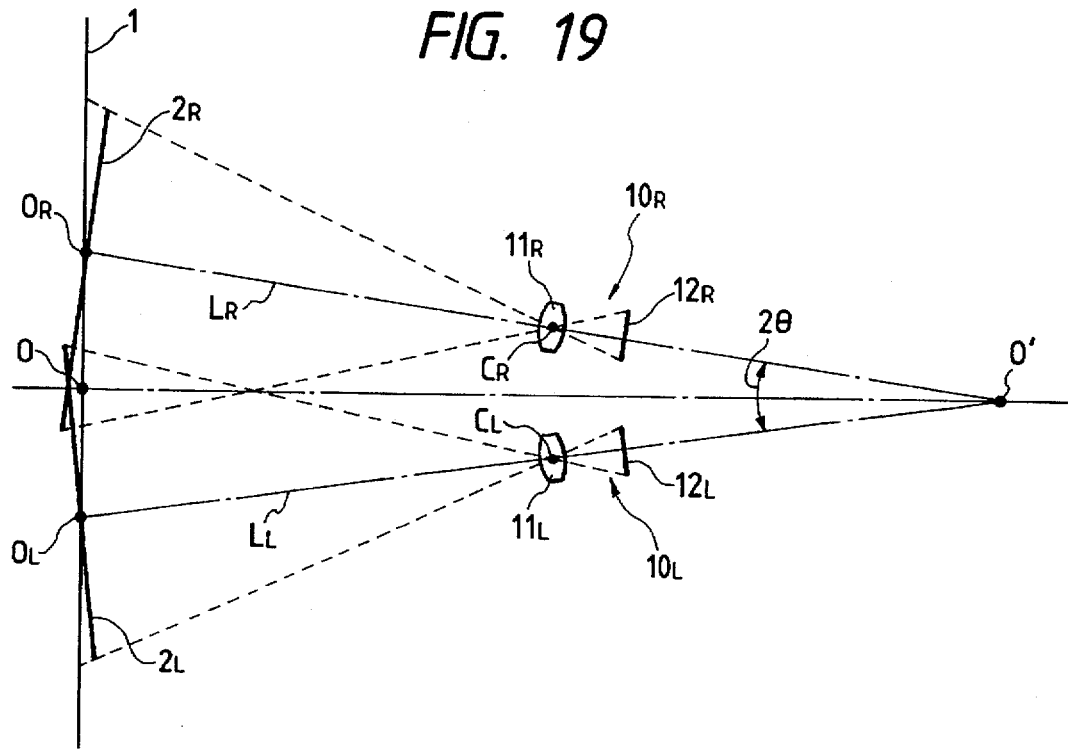
FIG. 19 is a drawing to show a basic layout of image pickup systems in an embodiment of double eye image pickup apparatus according to the present invention.

FIG. 19 is a drawing to show a basic arrangement of image pickup systems in an embodiment of double eye image pickup apparatus according to the present invention.

The double eye image pickup apparatus of the present embodiment includes two image pickup systems, i.e., a left image pickup system $10_L$ and a right image pickup system $10_R$. The left image pickup system $10_L$ is composed of a left image pickup optical system $11_L$ being a zoom lens system, and a left image sensor $12_L$ being an image pickup tube such as Saticon or a solid state image sensing device such as CCD. The right image pickup system $10_R$ has equivalent specifications to those of the left image pickup system $10_L$, which is composed of a right image pickup optical system $11_R$ being a zoom lens system, and a right image sensor $12_R$ being an image pickup tube such as Saticon or a solid state image sensing device such as CCD. The left image sensor $12_L$ and right image sensor $12_R$ may be not only of the single tube type (single plate type) as shown in FIG. 19, but also of the two tube type (two plate type) or of the three tube type (three plate type) through a color separation optical system.

The left pickup optical system $11_L$ and right pickup optical system $11_R$ are arranged as inclined at an angle θ in symmetry with respect to the normal line O–O' to the subject plane 1 such that the optical axis $L_L$ of left pickup optical system $11_L$ and the optical axis $L_R$ of right pickup optical system $11_R$ satisfy the conditions under which picked-up fields overlap with each other by a predetermined amount according to a screen of a selected aspect ratio. Accordingly, a left object plane $2_L$ conjugate with the left image sensor $12_L$ and a right object plane $2_R$ conjugate with the right image sensor $12_R$ are inclined at the angle θ relative to the subject plane 1. In the following description an angle 2θ is called as "convergence angle". Further, a point $O_L$ is defined as an intersection between the optical axis $L_L$ of left pickup optical system $11_L$ and the subject plane 1, a point $O_R$ an intersection between the optical axis $L_R$ of right pickup optical system $11_R$ and the subject plane 1, a point $C_L$ a principal point of left pickup optical system $11_L$ (exactly, the subject-side principal point), and a point $C_R$ a principal point of right pickup optical system $11_R$ (exactly, a subject-side principal point).

Figure 20:
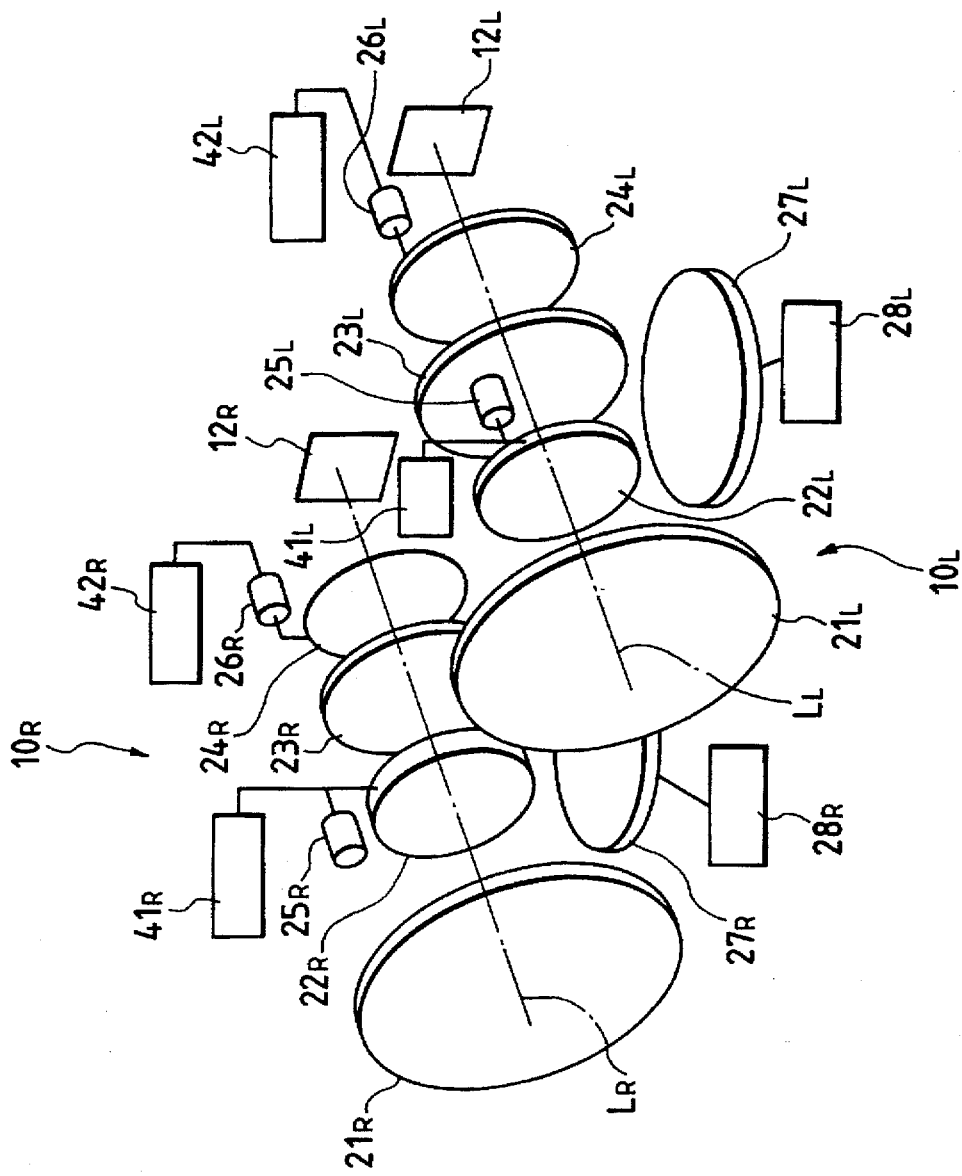
FIG. 20 is a schematic, structural drawing to show the structure of left image pickup optical system and right image pickup optical system shown in FIG. 19.

The constitution of left pickup optical system $11_L$ and right pickup optical system $11_R$ is next described based on the above-described basic arrangement and referring to FIG. 20.

The left pickup optical system $11_L$ includes lens groups $21_L$ through $24_L$ containing a zooming group $22_L$ and a focusing group $24_L$, a zoom motor $25_L$ which is a drive system for driving the zooming group $22_L$, a focus motor $26_L$ which is a drive system for driving the focusing group $24_L$, a mechanical system (not shown) and a drive system (a convergence angle motor $27_L$) for rotating the left pickup optical system $11_L$ and left image sensor $12_L$ together in a plane including the optical axis $L_L$, and a convergence angle encoder $28_L$ for detecting a rotational angle of convergence angle motor $27_L$. The convergence angle encoder $28_L$ may be an external member such as a rotary encoder, or one in which a drive system itself can detect a rotational angle by a driving method, such as a pulse motor.

The zoom motor $25_L$ in the left pickup optical system $11_L$ is driven by a zoom controlling portion (not shown) into which a zoom signal is input from the outside so as to set the left pickup optical system $11_L$ at a predetermined focal length. Also, the focus motor $26_L$ is driven by the zoom controlling portion (not shown) into which a focus signal is input from the outside so as to make the left pickup optical system $11_L$ in focus at a predetermined subject distance.

A zoom encoder $41_L$ in the left pickup optical system $11_L$ is for obtaining position information along the optical axis direction (along the direction of the optical axis $L_L$), of lens groups provided in the zooming group $22_L$, and the focal length of left pickup optical system $11_L$ can be obtained from an output signal from the zoom encoder $41_L$. Also, a focus encoder $42_L$ is for obtaining position information along the optical axis direction (along the direction of the optical axis $L_L$), of lens groups provided in the focusing group $24_L$, and the subject distance of the left pickup optical system $11_L$ can be obtained from an output signal from the focus encoder $42_L$. The zoom encoder $41_L$ and focus encoder $42_L$ may be external members such as potentiometers or systems in which a drive system itself can detect position information of lenses along the optical axis direction by a driving method, such as pulse motors.

The right pickup optical system $11_R$ is constructed in the same manner as the left pickup optical system $11_L$. The zoom motor $25_R$ in the right pickup optical system $11_R$ is driven by the above-described zoom controlling portion so that it has the same focal length as the left pickup optical system $11_L$. Also, the focus motor $26_R$ in the right pickup optical system $11_R$ is driven by the above-described zoom controlling portion so that it is focused at the same subject distance as the left pickup optical system $11_L$.

Figure 21:
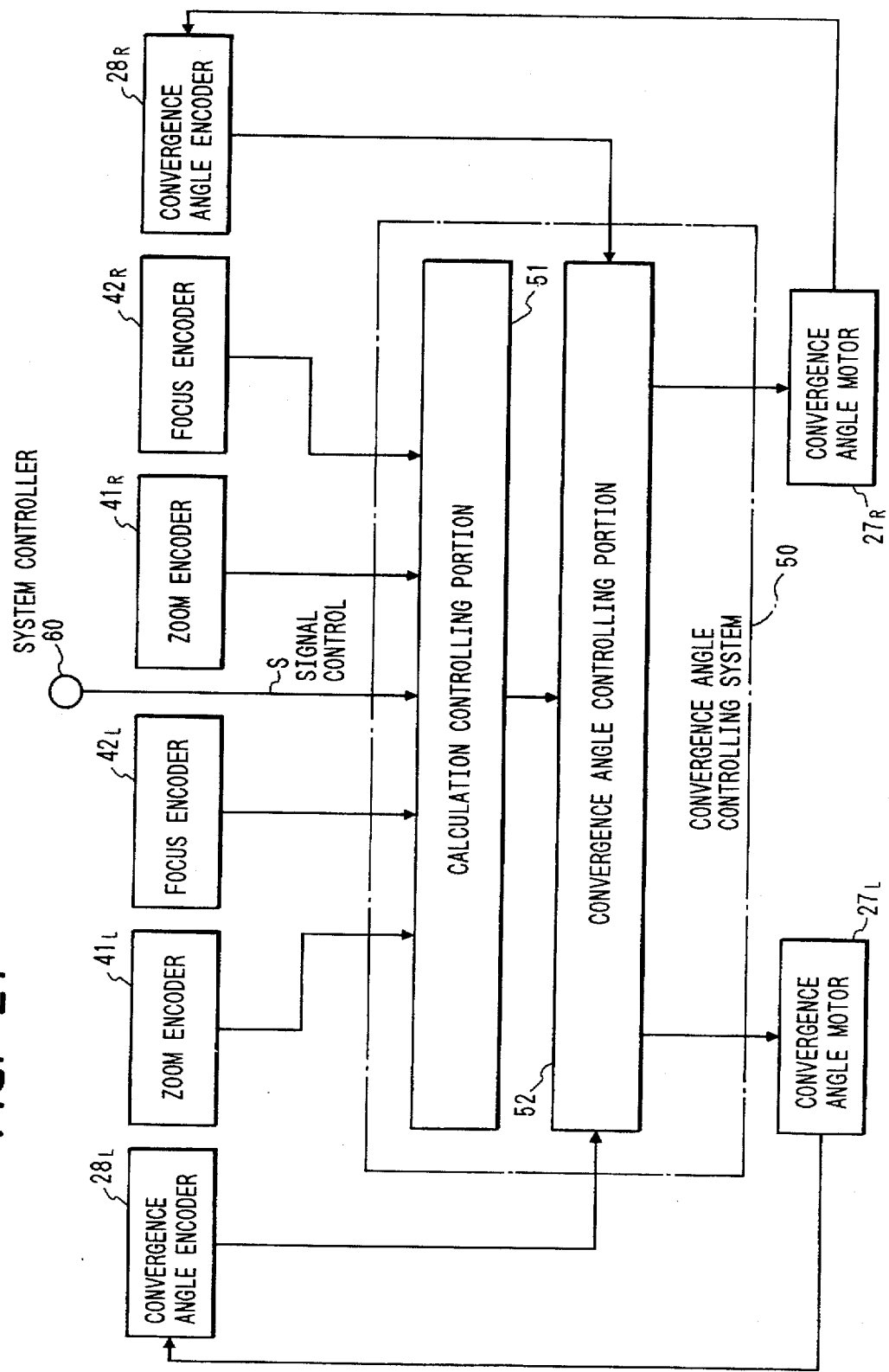
FIG. 21 is a block diagram to show the structure of a convergence angle control system in an embodiment of double eye image pickup apparatus according to the present invention.

Next described referring to FIG. 21 is a convergence angle control system 50 in the double eye image pickup apparatus in the present embodiment.

The convergence angle control system 50 has a calculation controlling portion 51 for determining a control target value of convergence angle for a combination-converted image to have a predetermined aspect ratio, according to optical parameters at least representing the imaging magnification and the object distance of the right pickup optical system $11_R$ and left pickup optical system $11_L$, and a convergence angle controlling portion 52 for controlling the convergence angle according to an output signal from the calculation controlling portion 51.

Supplied to the calculation controlling portion 51 are an output signal from the zoom encoder 41$_L$ and an output signal from the focus encoder 42$_L$ in the left pickup optical system 11$_L$, an output signal from the zoom encoder 41$_R$ and an output signal from the focus encoder 42$_R$ in the right pickup optical system 11$_R$, and a control signal S from a system controller 60. Supplied to the convergence angle controlling portion 52 are an output signal from the convergence angle encoder 28$_L$ in the left pickup optical system 11$_L$, an output signal from the convergence angle encoder 28$_R$ in the right pickup optical system 11$_R$, and an output signal from the calculation controlling portion 51. The convergence angle motor 27$_L$ in the left pickup optical system 11$_L$ and the convergence angle motor 27$_R$ in the right pickup optical system 11$_R$ each are driven by an output signal from the convergence angle controlling portion 52.

When the zooming group 22$_L$ is driven by the zoom motor 25$_L$ in the left pickup optical system 11$_L$, the output signal from the zoom encoder 41$_L$, indicating the position information along the optical axis direction, of each lens group in the zooming group 22$_L$, is input into the calculation controlling portion 51. When the zooming group 22$_R$ is driven by the zoom motor 25$_R$ in the right pickup optical system 11$_L$, the output signal from the zoom encoder 41$_R$, indicating the position information along the optical axis direction, of each lens group in the zooming group 22$_R$, is input into the calculation controlling portion 51.

When the focusing group 24$_L$ is driven by the focus motor 26$_L$ in the left pickup optical system 11$_L$, the output signal from the focus encoder 42$_L$, indicating the position information along the optical axis direction, of each lens group in the focusing group 24$_L$, is input into the calculation controlling portion 51. When the focusing group 24$_R$ is driven by the focus motor 26$_R$ in the right pickup optical system 11$_R$, the output signal from the focus encoder 42$_R$, indicating the position information along the optical axis direction, of each lens group in the focusing group 24$_R$, is input into the calculation controlling portion 51.

When the calculation controlling portion 51 receives the control signal S indicating an instruction to rotate the optical axes of left pickup optical system 11$_L$ and right pickup optical system 11$_R$ from the system controller 60, it produces a control target value of convergence angle 28 in accordance with the output signals from the zoom encoders 41$_L$, 41$_R$ and the output signals from the focus encoders 42$_L$, 42$_R$, and outputs an output signal indicating the thus produced control target value to the convergence angle controlling portion The convergence angle controlling portion 52 compares the output signal from the calculation controlling portion 51 with the output signal of each convergence angle encoder 28$_L$, 28$_R$ and produces output signals for driving the convergence angle motors 27$_L$, 27$_R$ so that an output signal from each convergence angle encoder 28$_L$, 28$_R$ becomes the produced control target value.

Figure 22:
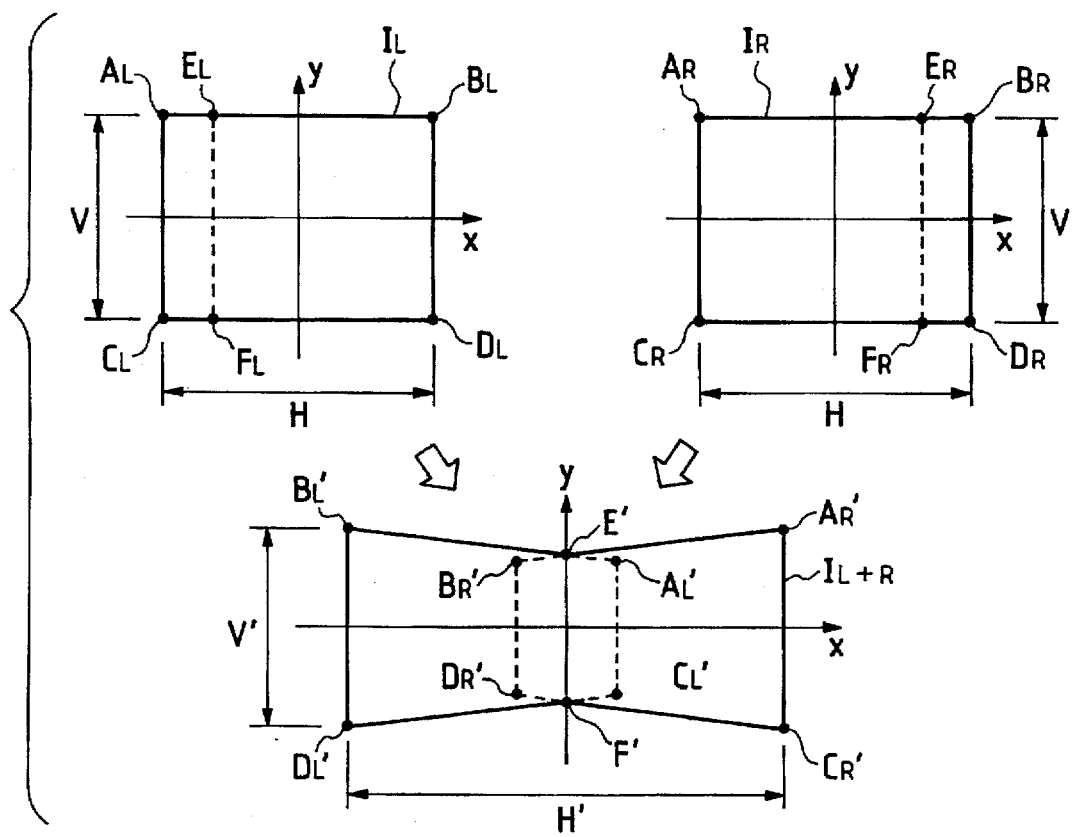
FIG. 22 is a drawing to illustrate a producing method of control target value of convergence angle in a calculation controlling portion shown in FIG. 21.

Next described referring to FIG. 19 and FIG. 22 is the method for producing the control target value of convergence angle in the calculation controlling portion 51.

Let β be the imaging magnification of the left pickup optical system 11$_L$ and right pickup optical system 11$_R$ shown in FIG. 19, z be the object distance (distance between point O$_L$ and point C$_L$ or distance between point O$_R$ and point C$_R$), and 2d be a distance (baseline length) between point C$_L$ and point C$_R$. If a visual point is set at a point on the normal line O–O ' a distance z' apart from the subject plane 1 on the point O' side and if a virtual image plane is taken so that a virtual imaging magnification at the visual point is β' (that is, so that the distance between the visual point and the image plane is β'z'), a virtual image plane I$_{L+R}$ combined between the image plane I$_L$ of left image sensor 12$_L$ and the image plane I$_R$ of right image sensor 12$_R$ is as shown in FIG. 22.

In FIG. 22, point A$_L$, point B$_L$, point C$_L$ and point D$_L$ are diagonal points in the image plane I$_L$ of left image sensor 12$_L$, which correspond to point A$_L$', point B$_1$', point C$_L$' and point D$_L$' on the virtual image plane I$_{L+R}$. Further, point A$_R$, point B$_R$, point C$_R$ and point D$_R$ are diagonal points of the image plane I$_R$ of right image sensor 12$_R$, which correspond to point A$_R$', point B$_R$', point C$_R$' and point D$_R$' on the virtual image plane I$_{L+R}$. In addition, point E$_L$ and point F$_L$ are points on the upper and lower edges to be the overlap center on the image plane I$_L$ of left image sensor 12$_L$, while point E$_R$ and point F$_R$ are points on the upper and lower edges to be the overlap center on the image plane I$_R$ of right image sensor 12$_R$. Here, point E$_L$ and point E$_R$ both correspond to point E' on the virtual image plane I$_{L+R}$, while point F$_L$ and point F$_R$ both to point F' on the virtual image plane I$_{L+R}$.

Defining a coordinate system on each image plane I$_L$, I$_R$ with the origin at the center of each image plane I$_L$, I$_R$, the x axis along the horizontal direction in FIG. 22 and the y axis along the vertical direction in FIG. 22, an image point (x$_R$,y$_R$) on the image plane I$_R$ of right image sensor 12$_R$ corresponds to an image point (x$_R$',y$_R$') on the virtual image plane I$_{L+R}$ as expressed by formula (11) and formula (12).

$$x'_R = \frac{x_R \cos(\theta) + \beta z \sin(\theta) + \beta d}{-x_R \sin(\theta) + \beta z'} \times (\beta'z') \quad (11)$$

$$y'_R = \frac{y_R}{-x_R \sin(\theta) + \beta z'} \times (\beta'z') \quad (12)$$

Also, an image point (x$_L$, y$_L$) on the image plane I$_L$ of left image sensor 12$_L$ corresponds to an image point (x$_L$', y$_L$') on the virtual image plane I$_{L+R}$ as expressed by formula (13) and formula (14).

$$x'_L = \frac{x_L \cos(\theta) - \beta z \sin(\theta) - \beta d}{x_L \sin(\theta) + \beta z'} \times (\beta'z') \quad (13)$$

$$y'_L = \frac{y_L}{x_L \sin(\theta) + \beta z'} \times (\beta'z') \quad (14)$$

Accordingly, by the geometric translation process as expressed by the above formulas (11) to (14) images on a plurality of image sensors with convergence can be combined as a single image on a virtual image plane. Therefore, if an image combination conversion processing portion for performing such a geometric translation process is provided in the calculation controlling portion 51, an image can be obtained as corrected in distortion caused by convergence. The image combination conversion processing portion functions as an image combination conversion processing portion for combination-converting a plurality of image signals output from a plurality of image pickup systems into image signals as output with arbitrary object distance and imaging magnification from virtual image pickup systems a position of a visual point and directions of optical axes of which are defined by a positional deviation amount of the visual point from the plurality of image pickup systems, and the convergence angle of the optical axes.

Defining the size of the image plane I$_L$ of left image sensor 12$_L$ and the image plane I$_R$ of right image sensor 12$_R$ as H×V (aspect ratio H/V) and the size of virtual image plane I$_{L+R}$ as H'×V' (aspect ratio H'/V'), x coordinates of point A$_R$' and point B$_L$' after conversion of point A$_R$' and point B$_L$' are obtained from the above formulas (11) and (13), whereby the horizontal length H' of the virtual image plane $I_{L+R}$ can be calculated. Also, y coordinates of point $B_L'$ and point $D_L'$ as converted from point $B_L$ and point $D_L$ are obtained from the above formulas (12) and (14), whereby the vertical length V' of the virtual image plane $I_{L+R}$ can be calculated. An aspect ratio of the virtual image plane $I_{L+R}$ as so obtained can be expressed by the following formula (15).

$$H'/V'=\sin(\theta+\omega)/\sin(\omega)-2\beta d/H|\times H/V \quad (15)$$

where $\omega=\tan^{-1}(-H/2\beta z)$ which is a horizontal half field angle of image pickup systems.

Accordingly, supposing the size H×V and the baseline length 2d of the image plane $I_L$ of left image sensor $12_L$ and the image plane $I_R$ of right image sensor $12_R$ both are constant, the above formula (15) may be written in the form of the following formula (16).

$$\theta=f(H'/V',\beta,z) \quad (16)$$

Namely, the convergence control angle θ to determine the aspect ratio H'/V' of the virtual image plane $I_{L+R}$ is determined by the imaging magnification β and the object distance z.

Then the calculation controlling portion 51 shown in FIG. 21 calculates an average value of output signals from the zoom encoders $41_L$, $41_R$ and an average value of output signals from the focus encoders $42_L$, $42_R$ and thereafter calculates an imaging magnification β from the two average values thus calculated using optical parameters of image pickup optical systems $11_L$, $11_R$ (for example, the focal length and principal point separation of lens groups constituting the image pickup optical systems $11_L$, $11_R$). Subsequently, the control target value of convergence angle is calculated based on the above formula (16) with the imaging magnification β and object distance z so that the aspect ratio H'/V' of the virtual image plane $I_{L+R}$ becomes a predetermined aspect ratio. The calculated control target value of convergence angle is supplied to the convergence angle controlling portion 52.

Although the present embodiment is so arranged as to obtain the average value of output signals from the zoom encoders $41_L$, $41_R$ and the average value of output signals from the focus encoders $42_L$, $42_R$, another arrangement may use an output signal from either one of the zoom encoders $41_L$, $41_R$ and an output signal from either one of the focus encoders $42_L$, $42_R$. Still another arrangement for obtaining the control target value of convergence angle is such that the calculation controlling portion 51 is provided with a table of convergence control angles θ depending upon the imaging magnification β and the object distance z and that the control target value of convergence angle is obtained referring to this table. Further, the convergence control angle θ may be calculated in such a manner that a relation between the imaging magnification β and object distance z, and the convergence control angle θ is approximated to a simple polynomial and that coefficients of the polynomial are stored in the calculation controlling portion 51 to calculate the convergence control angle θ.

According to the above procedure, an image is obtained at a predetermined aspect ratio. In this case, the obtained image needs no trimming treatment and the overlap areas can be taken as large as possible, so that a high-quality image can be obtained. The combination-processed image (virtual image plane $I_{L+R}$) has a somewhat distorted shape from the rectangular shape of region, as shown in FIG. 22. For example, if an image of aspect ratio 16:9 is indicated on an HD monitor, it can be considered that a frame line is indicated along its contour.

Figure 23:
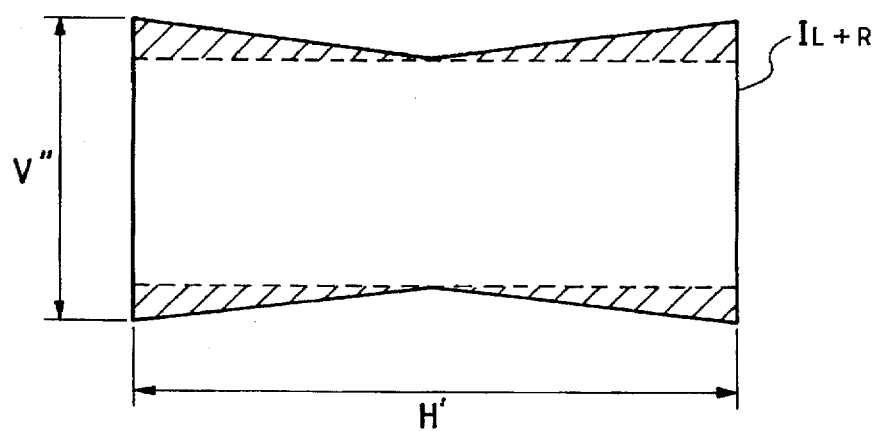
FIG. 23 is a drawing to illustrate another producing method of control target value of convergence angle in the calculation controlling portion shown in FIG. 21.

Next described referring to FIG. 23 is another method for producing the control target value of convergence angle in the calculation controlling portion 51.

The above-described producing method provides a somewhat distorted shape of combination-processed image, as shown in FIG. 22, with respect to the rectangular shape. In order to make the shape of region of the combination-processed image rectangular, a method to cut the hatched portions shown in FIG. 23 can be considered, for example. In this case, if the control target value of convergence angle is determined by the above-described producing method, the aspect ratio of virtual image plane $I_{L+R}$ is set slightly larger than the predetermined aspect ratio. Defining the size of virtual image plane $I_{L+R}$ as H'×V" (aspect ratio H'/V"), as shown in FIG. 23, an aspect ratio of an image after the combination process is expressed by the following formula (17) from the formulas (11) to (14), similarly as in the above-described producing method.

$$H'/V''=[\beta z \tan(\omega')\sin(\theta)+\beta z']/[(H/2)\sin(\theta)+\beta z']\times H'/V'' \quad (17)$$

where $\omega'=\tan^{-1}(\tan(\theta)+d/z\cos(\theta))$.

Also in this producing method, the controlling target value of convergence angle is calculated from the inverse transformation formula of the above formula (17) in accordance with the imaging magnification β and object distance z to attain the predetermined aspect ratio. Since the inverse transformation formula becomes very complicated in this producing method, it is preferred to use a method for obtaining the control target value of convergence angle with reference to a table or a method for calculating the control target value of convergence angle with approximation to a polynomial.

In this producing method, the upper and lower regions of the combined image is somewhat trimmed to obtain an image of the predetermined aspect ratio, which can be permissible as long as the degradation of image quality is not too much. Similarly, fine adjustment of the aspect ratio by slightly trimming the upper and lower or left and right regions of the combined image can be permissible as long as the degradation of image quality is not too much.

The above-described embodiments are so arranged that the convergence angle is controlled to keep a rotational amount of optical axis of one image pickup system equal to that of the other image pickup system, but a modification is possible such that only the optical axis of one image pickup system is arranged to rotate.

If the image pickup optical systems are zoom lens systems, the imaging magnification β changes during zooming. Thus, the aspect ratio also changes unless the convergence control angle θ is gradually changed. Namely, because it is apparent from the above formula (16) that the following formula (18) holds, a tracking control of convergence angle can be executed according to the formula (18) in order to keep the aspect ratio constant in zooming.

$$\theta=g(\beta,z) \quad (18)$$

Figure 24:
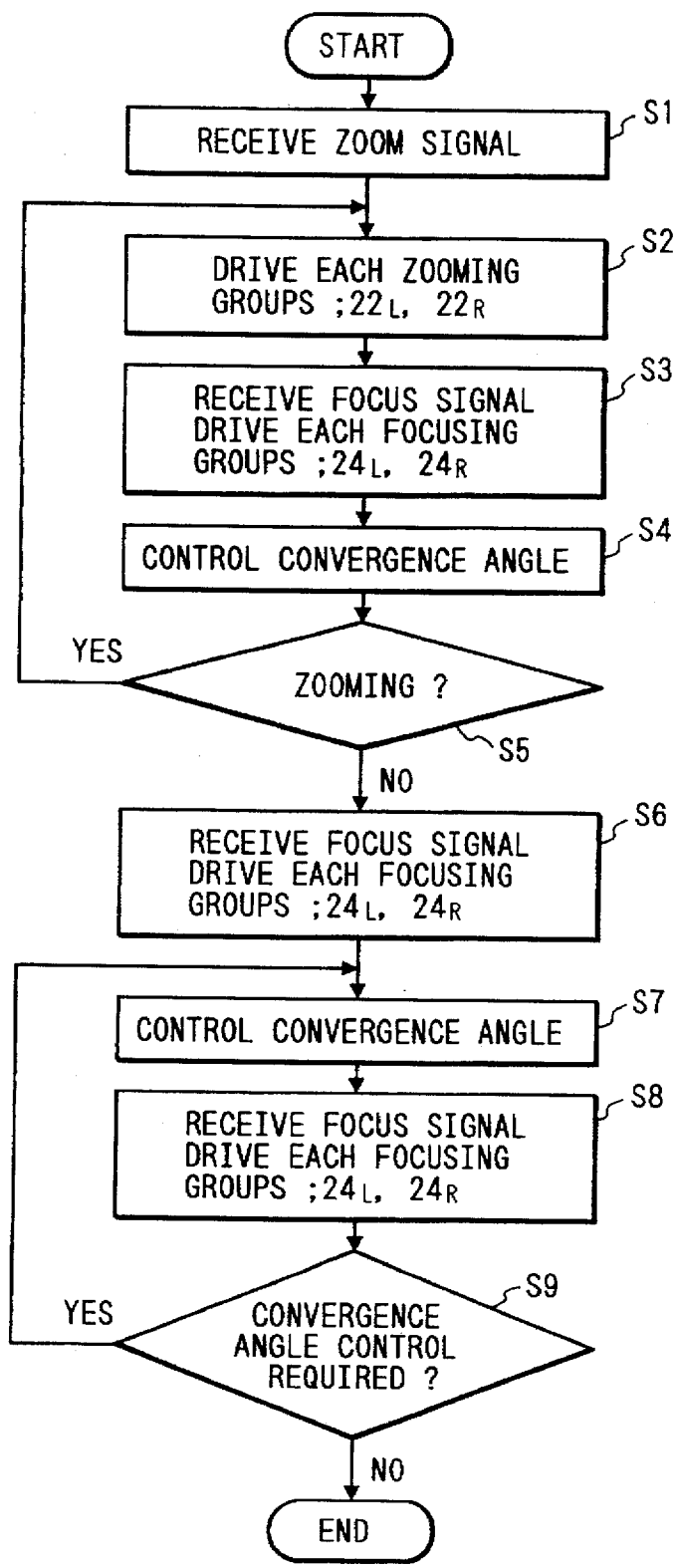
FIG. 24 is a flowchart to show an algorithm of convergence angle control in zooming in an embodiment of double eye image pickup apparatus according to the present invention.
Figure 25:
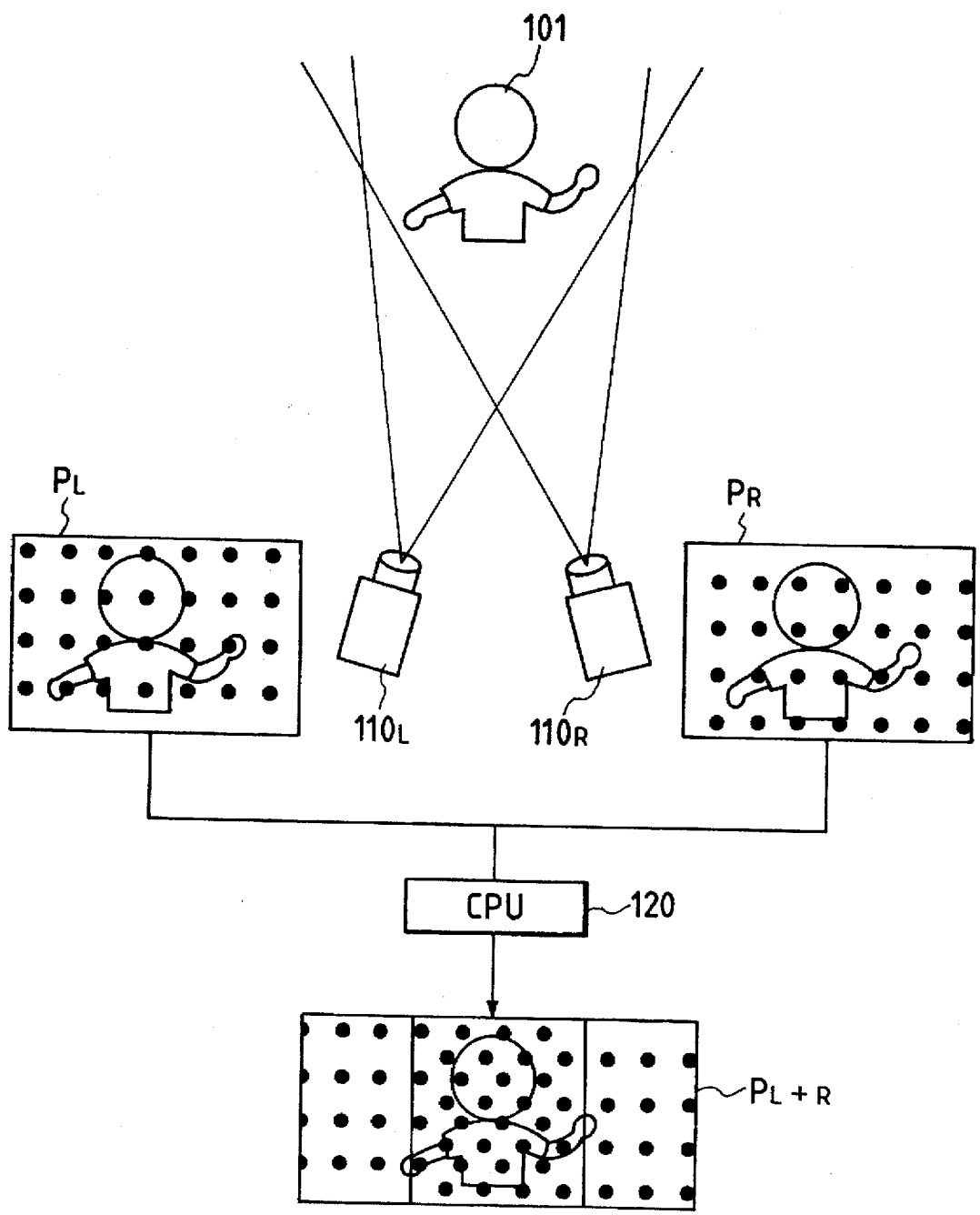
FIG. 25 is a conceptual drawing to show an example of double eye image pickup apparatus for producing an image at an arbitrary aspect ratio by combining two images obtained in taking a common subject using two image pickup systems with the fields thereof partly overlapping.

The algorithm of convergence angle control in zooming is next described referring to FIG. 24. This control is executed by the system controller 60 (see FIG. 21) for governing controls of the total system including the zooming, focusing and convergence.

When a zoom signal is received from the outside (Step S1), a control signal according to the zoom signal is output to the zoom control portion (not shown). By this, each zoom motor $25_L$, $25_R$ drives the corresponding zooming group $22_L$, $22_R$ so as to keep the focal length of image pickup optical system $10_L$, $10_R$ constant (Step S2). When a focus signal is then received from the outside, a control signal according to the focus signal is output to the focus control portion (not shown). By this, each focus motor $26_R$, $26_R$ drives the corresponding focusing group $24_L$, $24_R$ so as to keep each image pickup optical system $10_L$, $10_R$ in focus at a same subject distance (Step S3). Then the controller outputs a control signal S indicating an instruction of rotation of the optical axis of each image pickup optical system $11_L$, $11_R$ to the calculation controlling portion 51 (see FIG. 21). By this, the convergence angle control is carried out based on the above formula (18) (Step S4). Subsequently, whether the apparatus is in zooming or not is checked from presence or absence of a zoom signal from the outside, and with a judgement that the apparatus is in zooming, the Steps S2 to S4 are repeated (Step S5).

When a judgement that the apparatus is not in zooming is given at Step S5, the reception of a focus signal from the outside and the drive of each focusing group $24_L$, $24_R$ are again executed in the same manner as in the operation at Step S3 (Step S6). The reason why the focus control is again executed is that the systems could be out of focus due to the convergence angle control at Step S4. If the focus control changes the imaging magnification β, the convergence angle control is again executed in the same manner as in the operation at Step S4 (Step S7). Then the reception of a focus signal from the outside and the drive of each focusing group $24_L$, $24_R$ are again executed in the same manner as in the operation at Step S3 (Step S8). Subsequently, it is judged whether the focus control at Step S8 changed the imaging magnification β, so as to determine whether the convergence angle control is necessary or not. If the convergence angle control is necessary, the operations at Step S7 and Step S8 are repeated (Step S9). If the convergence angle control is unnecessary, the operation is ended.

According to the above processing, the convergence angle control can be carried out so as to keep the aspect ratio constant in zooming.

The focus signal may be one as set to be focused at an arbitrary subject distance given from the outside or may be an output signal from a well-known automatic focus detector. Specifically, if the focus signal is an output from an automatic focus detector, the convergence angle control can be done in real time during zooming, whereby the aspect ratio can be kept constant without feeling of incompatibility.

What is claimed is:

1. A double eye image pickup apparatus with a plurality of image pickup systems to perform image pickup with fields thereof at least partly overlapping with each other, comprising:

means for using image signals outputted from each image pickup system to detect corresponding points between images in said overlapping portion; and means for using image signals outputted from each image pickup system to detect an occlusion area in said overlapping portion;

means for detecting a depth information of a non-occlusion area neighboring said occlusion area in said overlapping portion based on an information of said corresponding points detected by said corresponding point detecting means;

means for projecting said occlusion area onto a virtual projection plane set based on said depth information detected by said depth information detecting means in order to provide a depth information of said occlusion area; and means for using said image signals outputted from each image pickup system and said depth information to form a single combined image.

2. The apparatus according to claim 1, wherein said means for using said image signals combines said projected image signals in an order selected according to position information in the subject space relating to each of said projected image signals.

3. A double eye image pickup apparatus comprising:

a first image pickup system and a second image pickup system for picking up an image with image fields thereof at least partly overlapping with each other, said first image pickup system and said second image pickup system being disposed so as to have a space of a base line length therebetween;

a first outputting means for outputting a first optical parameter for at least indicating an object distance and an imaging magnification of said first image pickup system;

a second outputting means for outputting a second optical parameter for at least indicating an object distance and an imaging magnification of said second image pickup system;

determining means for determining a convergence angle between said first and second image pickup systems such that a combined image obtained by combing a first image picked up by said first image pickup system with a second image picked up by said second image pickup system has an aspect ratio, according to said first and second optical parameters; and image combining means for combining said combined image from said first and second images, said combining means combination-converting said first and second images by using information of said base line length and said convergence angle and information of virtual object distance and imaging magnification of said combined image having said aspect ratio.

4. An apparatus according to claim 3 having driving means for rotating at least one of said first image pickup system and said second image pickup system so that a convergence angle between said first and second image pickup systems becomes said convergence angle determined by said determining means.

5. The apparatus according to claim 4, wherein said plurality of image pickup systems each are arranged as an image pickup system having a zooming function; and wherein said calculation controlling portion performs a convergence angle control of said plurality of image pickup systems so that the aspect ratio of the combination-converted image is kept constant in zooming said plurality of image pickup systems.

* * * * *

UNITED STATES PATENT AND TRADEMARK OFFICE
CERTIFICATE OF CORRECTION

PATENT NO.    : 5,682,198
DATED         : October 28, 1997
INVENTOR(S)   : Tatsushi Katayama et al.

It is certified that errors appear in the above-identified patent and that said Letters Patent is hereby corrected as shown below:

Column 10, line 24, change "$g_{iL}'$" to -- $g_{iL}$ --

Column 10, line 24, change "$g_{iR}'$" to -- $g_{iR}$ --

Column 10, line 41, change "$g_{iL}'$" to -- $g_{iL}$ --

Column 10, line 61, change "$x'_l = (k/2 - x_l) \times S'/z_l$" to -- $x_l' = (k/2 - x_l) \times S'/z_l$ --

Column 11, line 47, change "$f(x',y') = \sum_{i=j}^{m} \sum_{j=1}^{n} W(i,j) f(x'-i, y'-j)$"

to -- $f'(x',y') = \sum_{i=1}^{m} \sum_{j=1}^{n} W(i,j) f(x'-i, y'-j)$ --

Column 15, line 50, change "portion" to -- portion 52. --

Column 16, line 10, change "$B_l'$" to -- $B_L'$ --

Column 16, line 67, change "$A_R'$" to -- $A_R$ --

Column 16, line 67, change "$B_L'$" to -- $B_L$ --

UNITED STATES PATENT AND TRADEMARK OFFICE
CERTIFICATE OF CORRECTION

PATENT NO. : 5,682,198
DATED : October 28, 1997
INVENTOR(S) : Tatsushi Katayama et al.

It is certified that error appears in the above-identified patent and that said Letters Patent is hereby corrected as shown below:

Column 19, line 6, change "$26_R, 26_R$" to -- $26_L, 26_R$ --

Signed and Sealed this

Sixth Day of October, 1998

Attest:

BRUCE LEHMAN

Attesting Officer

Commissioner of Patents and Trademarks